United States Patent
Mita et al.

(10) Patent No.: US 8,564,283 B2
(45) Date of Patent: Oct. 22, 2013

(54) ROTATION-ANGLE-DETECTING APPARATUS, ROTATING MACHINE AND ROTATION-ANGLE-DETECTING METHOD

(75) Inventors: Masahiro Mita, Kumagaya (JP); Kyohei Aimuta, Kumagaya (JP); Osamu Shimoe, Kumagaya (JP); Rihito Kagawa, Kumagaya (JP)

(73) Assignee: Hitachi Metals, Ltd., Tokyo (JP)

( * ) Notice: Subject to any disclaimer, the term of this patent is extended or adjusted under 35 U.S.C. 154(b) by 532 days.

(21) Appl. No.: 12/866,509

(22) PCT Filed: Feb. 3, 2009

(86) PCT No.: PCT/JP2009/051768
§ 371 (c)(1),
(2), (4) Date: Aug. 6, 2010

(87) PCT Pub. No.: WO2009/099054
PCT Pub. Date: Aug. 13, 2009

(65) Prior Publication Data
US 2010/0321008 A1 Dec. 23, 2010

(30) Foreign Application Priority Data

Feb. 7, 2008 (JP) .................................. 2008-027636
Apr. 25, 2008 (JP) .................................. 2008-116246

(51) Int. Cl.
*G01B 7/30* (2006.01)

(52) U.S. Cl.
USPC .................................. 324/207.25; 324/207.12

(58) Field of Classification Search
USPC .................................................... 324/207.25
See application file for complete search history.

(56) References Cited

U.S. PATENT DOCUMENTS

| | | | | |
|---|---|---|---|---|
| 6,762,897 | B1 * | 7/2004 | Kabashima et al. | 360/72.1 |
| 2005/0278137 | A1 * | 12/2005 | Hammerschmidt et al. | 702/151 |
| 2006/0290545 | A1 * | 12/2006 | Granig et al. | 341/118 |

FOREIGN PATENT DOCUMENTS

| | | | |
|---|---|---|---|
| JP | 05-296792 A | | 11/1993 |
| JP | 11-118520 A | | 4/1999 |
| JP | 2004325140 A | * | 11/2004 |
| JP | 2006-023179 A | | 1/2006 |
| JP | 2006-194861 A | | 7/2006 |
| WO | 99/13296 A1 | | 3/1999 |

* cited by examiner

*Primary Examiner* — Patrick Assouad
*Assistant Examiner* — Stephen G Armstrong
(74) *Attorney, Agent, or Firm* — Sughrue Mion, PLLC

(57) ABSTRACT

An apparatus for detecting a rotation angle using a magnet rotor comprising a magnet having 2N poles, wherein N is a natural number, and a sensor device for detecting the direction of a magnetic flux from the magnet rotor, at least one of two output voltages obtained in radial and rotational directions by the sensor device being multiplied by a correction coefficient, and the rotation angle being calculated from the two corrected output voltages to increase the detection accuracy of the rotation angle.

18 Claims, 32 Drawing Sheets

(a) Before Adjustment (b) After Adjustment (c) Angle Error (a) Before Adjustment A-A Cross Section A-A Cross Section A-A Cross Section

ROTATION-ANGLE-DETECTING APPARATUS, ROTATING MACHINE AND ROTATION-ANGLE-DETECTING METHOD

FIELD OF THE INVENTION

The present invention relates to an apparatus for detecting the rotation angle of a rotational shaft, etc., a rotating machine comprising such apparatus, and a rotation-angle-detecting method.

BACKGROUND OF THE INVENTION

When a cylindrical magnet having a lot of magnetic poles on a peripheral surface rotates around a cylindrical shaft, magnetic flux densities of the cylindrical magnet in radial and circumferential directions at a position separate from the peripheral surface by a predetermined distance ($r_1$) change substantially sinusoidally with the rotation angle. In this case, the amplitude of magnetic flux density in a radial direction is as large as about 1-2 times that of magnetic flux density in a rotational direction.

A rotation-angle-detecting apparatus can be constituted by a sensor device (magnetic sensor comprising pluralities of spin-valve, giant-magnetoresistive devices) disposed at a position separate from the magnet by the distance ($r_1$), to measure magnetic flux densities in radial and rotational directions.

Because the sensor device detects not a magnetic field intensity but the direction of a magnetic flux, magnetic flux densities with different amplitudes in radial and rotational directions cause a sensor device having a magnetosensitive axis in a radial direction to generate a first output voltage ($V_x$) in a trapezoidal waveform, and a sensor device having a magnetosensitive axis in a rotational direction to generate a second output voltage ($V_y$) in a triangular waveform. Using a sensor device having two perpendicular magnetosensitive axes on one substrate, the first and second output voltages can be obtained simultaneously.

When a magnetic flux density is within a certain range, the amplitudes of output voltages are substantially constant regardless of the maximum magnetic flux densities in radial and rotational directions. Namely, the first and second output voltages are $V_x = \cos\theta_{mag}$ and $V_y = \sin\theta_{mag}$ at a magnet rotation angle $\theta_{mag}$ as described later, with their amplitudes substantially equal, though actual waveforms including harmonics are trapezoidal and triangular. Thus, the first and second output voltages have different waveforms, and their amplitudes are substantially equal despite different magnetic flux density amplitudes, resulting in measured rotation angle errors (angle errors).

JP 2006-023179 A discloses a magnetic position detection apparatus comprising a magnetic member, and plural pairs of vector-detection-type magnetoresistive devices opposing magnetic poles of the magnetic member, plural pairs of the vector-detection-type magnetoresistive devices being arranged such that their magnetosensitive planes are substantially parallel to an external magnetic field generated from the magnetic member, and that the magnetization directions of pin layers in a pair of the vector-detection-type magnetoresistive devices are deviated from each other by substantially 90°, and all of the vector-detection-type magnetoresistive devices being disposed at the same position in the magnetic pole arrangement direction of the magnetic member. JP 2006-023179 A describes that the relative movement of the magnetic member and the vector-detection-type magnetoresistive devices shown in FIG. 1(A) provides two sinusoidal outputs with 90° phase deviation.

As described in JP 2006-023179 A, two sinusoidal outputs with 90° phase deviation are obtained only when an amplitude ratio of a magnetic flux density in the movement direction to a magnetic flux density in a direction vertical to the magnetic member is substantially 1 (when the magnetic poles have extremely large transverse sizes relative to the magnetization pitch of the magnetic member). However, because the magnetic flux density amplitudes are different, output voltages supplied from magnetic field detectors actually have trapezoidal and triangular waveforms having high-order harmonics, resulting in position detection errors, thus failing to achieve accurate measurement.

JP 2006-194861 A discloses a method for detecting a rotation angle using magnetoresistive devices, in which signal phase errors, deformation errors, etc., in outputs from the magnetoresistive devices are reduced by various waveform adjustments. However, it fails to describe a method for reducing errors due to unevenness (amplitude differences of an external magnetic field, etc.) inevitably occurring in a rotating parallel magnetic field.

JP 2006-023179 A and JP 2006-194861 A never describe nor suggest that because a magnetic flux density in a radial direction has a larger amplitude than that of a magnetic flux density in a rotational direction, output voltages have different waveforms in radial and rotational directions, resulting in angle errors. In the technologies described in these references, the transverse size of magnetic poles should be, for instance, about 100 times the magnetic pole pitch, to make the magnetic flux density amplitude in the movement direction equal to that in a direction vertical to the magnetic member. However, it is not practical to use such a large magnetic member for the detection of a rotation angle or a moving distance.

As described above, when two output voltages obtained from sensor devices capable of detecting the direction of a magnetic flux are subjected to arctangent calculation to determine the electric or rotation angle of a magnet rotor, a rotation-angle-detecting apparatus provides large angle errors.

OBJECT OF THE INVENTION

Accordingly, an object of the present invention is to provide a rotation-angle-detecting apparatus capable of detecting a rotation angle with high accuracy, and a rotating machine comprising it.

DISCLOSURE OF THE INVENTION

As a result of intense research in view of the above object, the inventors have found that in a rotation-angle-detecting apparatus comprising a sensor device for detecting the direction of a magnetic flux, angle errors can be reduced drastically by multiplying (or dividing) at least one of two output voltages (or output voltage waveforms) in radial and rotational directions obtained from the sensor device by a correction coefficient, making a ratio of the maximum values of the two corrected output voltages (or output voltage waveforms) equal to a ratio K' of the maximum magnetic flux densities in radial and rotational directions at the position of the sensor device, and conducting arctangent calculation. The present invention has been completed based on such finding.

As shown in FIG. 27, the rotation-angle-detecting apparatus of the present invention enlarges at least one of the amplitudes of the measured output voltage waveforms to make a ratio of the two maximum output voltage waveforms equal to a ratio of the maximum magnetic flux densities in two directions, and then determines a rotation angle and a mechanical angle. This adjustment may be any one of a method of enlarging only one amplitude, a method of reducing only one amplitude, and a method of multiplying both amplitudes by a predetermined coefficient, as long as the ratio of the two maximum output voltage waveforms becomes the above ratio K'. Though explanation will be made below on the multiplication of one amplitude by a correction coefficient, the present invention is not restricted thereto, but the other amplitude may be divided by a correction coefficient, or both amplitudes may be multiplied by different coefficients.

Thus, the apparatus of the present invention for detecting a rotation angle comprises a magnet rotor comprising a magnet having 2N poles, wherein N is a natural number, and a sensor device for detecting the direction of a magnetic flux from the magnet rotor, at least one of two output voltages obtained in radial and rotational directions by the sensor device being multiplied by a correction coefficient, and the rotation angle being calculated from the two corrected output voltages to increase the detection accuracy of the rotation angle.

Another rotation-angle-detecting apparatus of the present invention comprises a magnet rotor comprising a magnet having 2N poles, wherein N is a natural number, and a sensor device for detecting the direction of a magnetic flux from the magnet rotor, the sensor device having a magnetosensitive plane constituted by pluralities of spin-valve, giant-magnetoresistive devices each having a pinned layer whose magnetization direction is fixed and a free layer whose magnetization direction rotates depending on the direction of a magnetic flux, thereby having sensor bridges A01 and B01 each having pinned layers whose magnetization directions are perpendicular to each other, each of the sensor bridges A01 and B01 being a bridge circuit comprising the spin-valve, giant-magnetoresistive devices, the spin-valve, giant-magnetoresistive devices on the electrically adjacent sides in each of the bridge circuits having pinned layers having antiparallel magnetization directions, with voltage applied, each of the sensor bridges A01 and B01 providing output voltages depending on an angle between the magnetization direction of the pinned layer and the magnetization direction of the free layer, and at least one of the output voltages being multiplied by a correction coefficient to obtain two outputs, from which an angle signal is obtained.

The sensor device preferably has a magnetosensitive plane constituted by pluralities of spin-valve, giant-magnetoresistive devices having pinned layers whose magnetization directions are fixed to two perpendicular directions and free layers whose magnetization directions rotate depending on the direction of a magnetic flux, the correction coefficient being a value depending on a ratio of the maximum magnetic flux density in a radial direction to the maximum magnetic flux density in a rotational direction at the position of the sensor device.

A ratio K of the peak value of the corrected output voltage in a radial direction to the peak value of the output voltage in a rotational direction is preferably within a range of K=K'0.3N, wherein K' is a ratio $B\perp/B_{//}$ of the amplitude $B\perp$ of a magnetic flux density in a radial direction to the amplitude $B_{//}$ of a magnetic flux density in a rotational direction at the position of the sensor device.

A further apparatus of the present invention for detecting a rotation angle comprises a magnet rotor comprising a magnet having 2N poles, wherein N is a natural number, and a sensor device for detecting the direction of a magnetic flux from the magnet rotor, a waveform amplitude of at least one of two output voltages obtained in radial and rotational directions by the sensor device being multiplied by a correction coefficient, and the rotation angle being calculated from the two corrected output waveforms to increase the detection accuracy of the rotation angle.

The sensor device preferably has a magneto sensitive plane constituted by pluralities of spin-valve, giant-magnetoresistive devices having pinned layers whose magnetization directions are fixed to two perpendicular directions and free layers whose magnetization directions rotate depending on the direction of a magnetic flux, the correction coefficient being a value depending on a ratio of the maximum amplitude of a magnetic flux density waveform in a radial direction to the maximum amplitude of a magnetic flux density waveform in a rotational direction at the position of the sensor device.

A ratio K of the peak value of the corrected output waveform in a radial direction to the peak value of the output waveform in a rotational direction is preferably within a range of K=K'±0.3N, wherein K' is a ratio $B\perp/B_{//}$ of the amplitude of a magnetic flux density in a radial direction to the amplitude $B_{//}$ of a magnetic flux density in a rotational direction at the position of the sensor device.

A still further rotation-angle-detecting apparatus of the present invention comprises a magnet rotor comprising a magnet having 2N poles, wherein N is a natural number, and a sensor device for detecting the direction of a magnetic flux from the magnet rotor, the sensor device having a magneto sensitive plane constituted by pluralities of spin-valve, giant-magnetoresistive devices each having a pinned layer whose magnetization direction is fixed and a free layer whose magnetization direction rotates depending on the direction of a magnetic flux, thereby having sensor bridges A01 and B01 each having pinned layers whose magnetization directions are perpendicular to each other, each of the sensor bridges A01 and B01 being a bridge circuit comprising the spin-valve, giant-magnetoresistive devices, the spin-valve, giant-magnetoresistive devices on the electrically adjacent sides in each of the bridge circuits having pinned layers having antiparallel magnetization directions, with voltage applied, each of the sensor bridges A01 and B01 providing output voltages ($V_x$, $V_y$) depending on an angle between the magnetization direction of the pinned layer and the magnetization direction of the free layer, wherein $V_x$ is the output voltage of the sensor bridge A01 whose pinned layers have a magnetization direction in the radial direction of the magnet rotor, and $V_y$ is the output voltage of the sensor bridge B01 whose pinned layers have a magnetization direction in the rotational direction of the magnet rotor, and at least one of the output voltages being multiplied by a correction coefficient to obtain an angle signal, wherein the correction coefficient is calculated from $a_1$, $a_3$, $b_1$ and $b_3$ in the following Fourier series (1-1) and (1-2) expanded from $V_x$ and $V_y$ in one period of electric angle;

$$V_x = a_1 \cos\theta_{mag} + a_3 \cos 3\theta_{mag} + a_5 \cos 5\theta_{mag} + \ldots \quad (1\text{-}1), \text{ and}$$

$$V_y = b_1 \sin\theta_{mag} + b_3 \sin 3\theta_{mag} + b_5 \sin 5\theta_{mag} + \ldots \quad (1\text{-}2).$$

The apparatus preferably uses a correction coefficient k=k'0.3N, wherein N is the number of pole pairs in the magnet rotor, and k' is represented by the formula (2) of $k'=(a_1-a_3)/(b_1+b_3)$, wherein $a_1$, $a_3$, $b_1$ and $b_3$ are given by the formulae (1-1) and (1-2).

The sensor device is preferably disposed at a position where the maximum magnetic flux density in a radial direction is different from the maximum magnetic flux density in a rotational direction.

A center of a magnetosensitive plane of the sensor device preferably passes a thickness center of the magnet rotor in an axial direction and is positioned on a plane perpendicular to the rotation axis.

The rotating machine of the present invention comprising any one of the above rotation-angle-detecting apparatuses.

The method of the present invention for detecting the rotation angle of a magnet rotor comprising a magnet having 2N poles, wherein N is a natural number, comprises measuring the periodic changes of a magnetic flux generated from the magnet rotor in radial and rotational directions by a sensor device to obtain output voltages ($V_x$, $V_y$), and multiplying at least one of the output voltages by a correction coefficient to determine the rotation angle $\theta_{meas}$ of the magnet rotor.

A ratio K of the peak value of the corrected output voltage in a radial direction to the peak value of the output voltage in a rotational direction is preferably within a range of K=K'±0.3N, wherein K' is a ratio $B\perp/B_{//}$ of the amplitude $B\perp$ of a magnetic flux density in a radial direction to the amplitude $B_{//}$ of a magnetic flux density in a rotational direction at the position of the sensor device.

Using k as the correction coefficient, the rotation angle $\theta_{meas}$ of the magnet rotor is preferably determined by the formula (3) or (4);

$$\theta_{meas}=\tan^{-1}[V_x/(V_y \cdot k)] \quad (3),$$

when the AC power in a rotational direction is smaller, and $$\theta_{meas}=\tan^{-1}[(V_x \cdot k)/V_y]] \quad (4),$$

when the AC power in a radial direction is smaller.

The correction coefficient k is preferably determined from K', which is an amplitude ratio $B\perp/B_{//}$ of the amplitude $B\perp$ of a magnetic flux density in a radial direction to the amplitude $B_{//}$ of a magnetic flux density in a rotational direction at the position of the sensor device.

The correction coefficient k is preferably calculated from $a_1$, $a_3$, $b_1$ and $b_3$ in the Fourier series (5-1) and (5-2) expanded from the output voltages ($V_x$, $V_y$) in one period of the electric angle;

$$V_x = a_1 \cos \theta_{mag} + a_3 \cos 3\theta_{mag} + a_5 \cos 5\theta_{mag} + \ldots \quad (5\text{-}1), \text{ and}$$

$$V_y = b_1 \sin \theta_{mag} + b_3 \sin 3\theta_{mag} + b_5 \sin 5\theta_{mag} + \ldots \quad (5\text{-}2).$$

The correction coefficient k is preferably calculated from k', which is determined from $a_1$, $a_3$, $b_1$ and $b_3$ by the following formula (6);

$$k'=(a_1-a_3)/(b_1+b_3) \quad (6).$$

The correction coefficient k is preferably a value within a range of k=k'±0.3N, wherein N is the number of pole pairs of the magnet rotor, and k' is determined by the formula (6).

The maximum magnetic flux densities in radial and rotational directions can be measured by a Hall device at a position where the direction of a magnetic flux is measured (at the position of the sensor device), in two measuring directions of the sensor device (radial and rotational directions).

In the rotation-angle-detecting apparatus comprising a magnet rotor provided with N pole pairs, and a sensor device having spin-valve, giant-magnetoresistive devices, the magnet rotor is rotated to measure output voltages corresponding to the rotation angle of the magnet rotor, resulting in output voltage (a first output voltage) having a substantially trapezoidal waveform by a sensor bridge having a magnetosensitive axis in a radial direction, and output voltage (a second output voltage) having a substantially triangular waveform by a sensor bridge having a magnetosensitive axis in a rotational direction. With the second output voltage amplified by a correction coefficient k substantially equal to the magnetic flux density amplitude ratio K', the rotation angle can be detected with high accuracy.

Among the output voltages, the output voltage with smaller AC power is preferably multiplied by the correction coefficient k. Because the second output voltage generally has smaller AC power than the first output voltage, the second output voltage is preferably multiplied by k. Thus, output voltage providing a smaller area defined by a mechanical angle (the axis of abscissas) and a sensor output waveform is multiplied by a correction coefficient k as shown in FIG. 7(a), and the adjusted sensor output is used to calculate the rotation angle as shown in FIG. 7(b). Alternatively, output voltage providing a larger area defined by a mechanical angle (the axis of abscissas) and a sensor output waveform may be divided by a correction coefficient k to calculate the rotation angle. Further, two numbers providing the correction coefficient k by multiplication may be calculated, so that they are multiplied by both waveforms. When k' calculated by the formula (2) is used as a correction coefficient k, the correction coefficient k is multiplied by the output voltage (second output voltage) of the sensor bridge having a magnetosensitive axis in a rotational direction.

The magnet rotor is preferably provided with pluralities of magnetic poles such as two pole pairs or more. One pole pair means a combination of one N pole and two S poles adjacent thereto. For instance, when the magnet rotor is provided with 12 magnetic poles, it has 6 pole pairs. The sensor device has two sensor bridges, which are perpendicular to each other with respect to the magnetization direction of the pinned layer of an element.

The sensor device is disposed near the magnet rotor, such that the magnetization directions of the free layers of spin-valve, giant-magnetoresistive devices (elements) rotate when the magnet rotor rotates. Because elements are inclined to each other by 90° in the sensor bridge in one sensor device, the rotation angle can be measured accurately even if the sensor devices do not have phase difference of 90°.

The axial thickness (t) of the magnet corresponds to the magnet size in a rotation-axis direction. The center of the sensor device is defined as a center of a spin-valve, giant-magnetoresistive device. When there are pluralities of spin-valve, giant-magnetoresistive devices, the center is located at a position substantially equally distant from them. Because the spin-valve, giant-magnetoresistive devices are sufficiently thinner than the magnet rotor, the center may be regarded as being located on a substrate on which the spin-valve, giant-magnetoresistive devices are formed. Namely, the center of the sensor device is on a magnetosensitive plane. Two magnetosensitive axes are perpendicular to each other in the magnetosensitive plane or in parallel to the magnetosensitive plane.

The term "sensor bridge" used herein means an electric circuit bridge including four elements (spin-valve, giant-magnetoresistive devices), and a surface having four elements is a magnetosensitive plane. The sensor device has two sensor bridges. A structure in which the magnet rotor is opposite to the sensor device is called rotation-angle-detecting apparatus. A set of plural sensor devices, which is assembled in the rotation-angle-detecting apparatus, is called module.

DESCRIPTION OF THE BEST MODE OF THE INVENTION

Figure 1A:
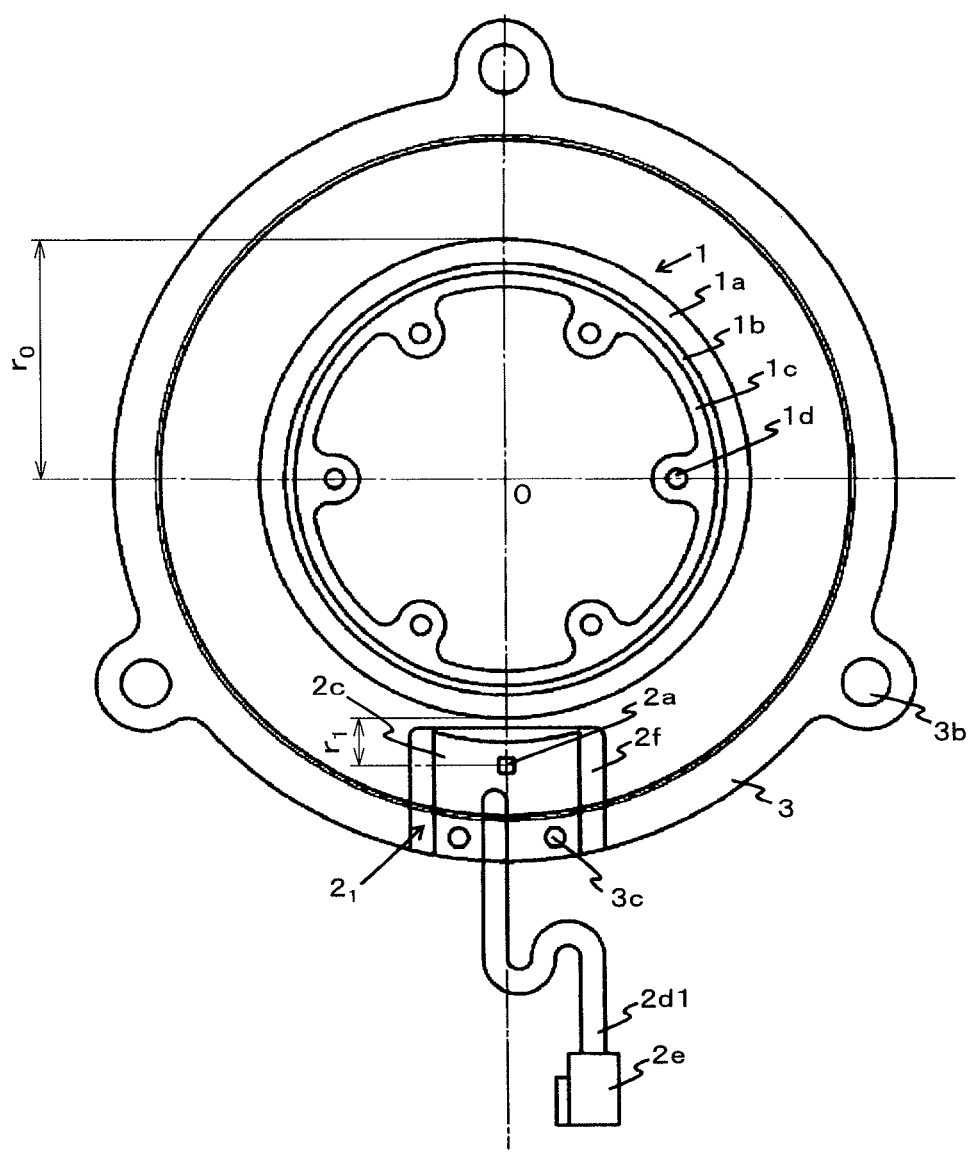
FIG. 1(a) is a schematic front view showing one example of the rotation-angle-detecting apparatuses of the present invention.

The embodiments of the present invention will be explained below referring to the drawings, though it is not restricted to these embodiments.

[1] Embodiment of Rotation-Angle-Detecting Apparatus

Figure 1B:
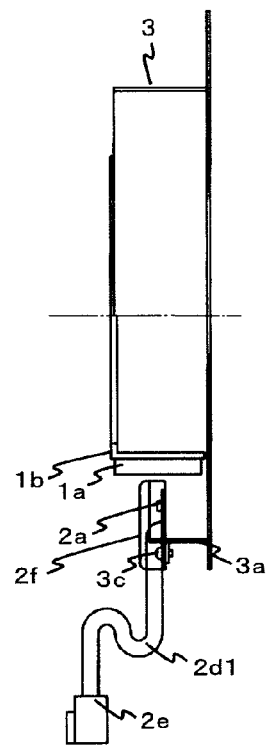
FIG. 1(b) is a schematic side view showing one example of the rotation-angle-detecting apparatuses of the present invention, with a partial cross-sectional view below the chain line showing a cross section of the magnet rotor.

FIGS. 1(a) and 1(b) show a rotation-angle-detecting apparatus comprising a magnet rotor 1 having six pole pairs on a peripheral surface, and a housing 3 to which a magnetic sensor $2_1$ supporting a sensor device 2a is fixed. The magnet rotor 1 has a rotation axis passing a point O and vertical to the paper plane. The sensor device 2a comprising bridge circuits each having two spin-valve, giant-magnetoresistive devices, whose pinned layers have magnetization directions perpendicular to each other, can detect the rotation angle of a ring-shaped permanent magnet 1a in the magnet rotor 1.

The magnet rotor 1 comprises a ring-shaped permanent magnet 1a, a soft-magnetic ring 1b integrally provided inside the ring-shaped permanent magnet, and a ring-shaped, non-magnetic adaptor 1c supporting the soft-magnetic ring. The magnetic sensor $2_1$ comprises a plate-like circuit board 2c having one side surface opposing the magnet rotor 1, a sensor device 2a mounted onto the circuit board 2c, a cable 2d1 and a connector 2e electrically connecting the sensor device 2a and the circuit board 2c to a control circuit, and a non-magnetic cover 2f covering the sensor device. The ring-shaped permanent magnet 1a has six pole pairs arranged such that their magnetization directions are perpendicular to the rotation axis of the magnet rotor. The housing 3 is provided with a U-shaped angle member 3a and bolts 3c for fixing the circuit board 2c such that the sensor device 2a opposes the magnet rotor 1 at a predetermined interval. A surface of the circuit board 2c, onto which the sensor device is mounted, is perpendicular to the rotation axis of the magnet rotor. The details of the sensor device, etc. will be explained later.

In the rotation-angle-detecting apparatus shown in FIGS. 1(a) and 1(b), the housing 3 comprising the magnetic sensor $2_1$ is fixed to a machine tool body with bolts inserted into holes 3b, and the magnet rotor 1 is coaxially fixed to a machine tool shaft (rotation axis) with bolts inserted into holes 1d, though the machine tool is not shown in FIGS. 1(a) and 1(b). As shown in FIG. 1(a), by rotating the machine tool shaft while keeping the magnet rotor 1 opposite to the magnetic sensor $2_1$, the rotation angle can be detected with high accuracy.

Figure 2A:
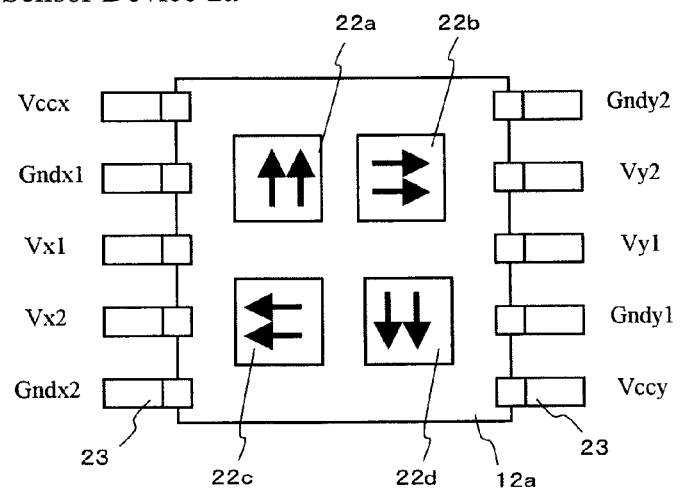
FIG. 2(a) is a schematic view showing one example of sensor devices used in the rotation-angle-detecting apparatus of the present invention.
Figure 2B:
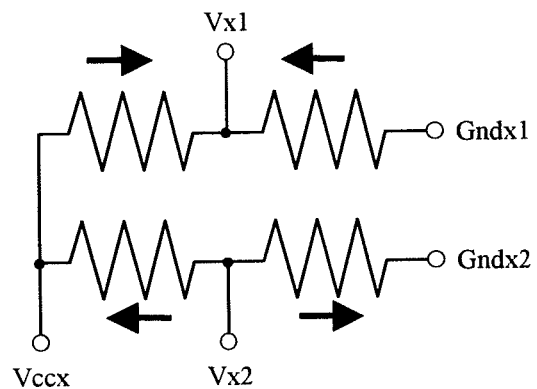
FIG. 2(b) is a view showing the bridge circuit connection of elements to terminals, with the magnetization directions of pinned layers in the sensor device in FIG. 2(a) aligned with the radial direction of a magnet rotor.
Figure 2C:
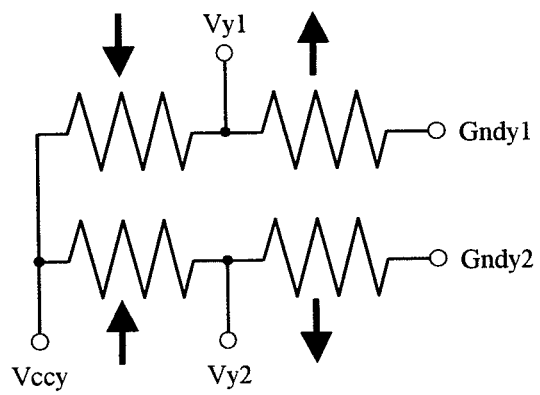
FIG. 2(c) is a view showing the bridge circuit connection of elements to terminals, with the magnetization directions of pinned layers in the sensor device in FIG. 2(a) aligned with the rotational direction of a magnet rotor.

The magnet rotor 1 is constituted by the ring-shaped permanent magnet 1a made of a bonded Nd—Fe—B magnet, the soft-magnetic ring 1b formed by soft iron powder and a binder, and an S45C-made adaptor 1c for attaching the soft-magnetic ring to the shaft (rotation axis). As shown in FIGS. 2(a) to 2(c), the sensor device 2a comprises full bridge circuits constituted by eight spin-valve, giant-magnetoresistive devices (elements). When the sensor device 2a is placed in a magnetic field generated from the magnet rotor with DC voltage applied between Vcc and GND, differential outputs are generated between $V_{x1}$ and $V_{x2}$ and between $V_{y1}$ and $V_{y2}$. The sensor device 2a comprises a circuit board 2c fixed to the housing 3, and a connector 2e is connected via a cable 2d1 to a later-described circuit shown in FIG. 4 (circuit comprising an A-D conversion correction means and an angle-calculating means). One of A-D-converted signals is multiplied by a correction coefficient k (for instance, k=1.6) for angle calculation. The resin-molded sensor device comprises 10 terminals 23 formed by a non-magnetic leadframe. The housing 3 and the U-shaped angle member 3a are preferably formed by non-magnetic SUSU316, and the U-shaped angle member can be produced by pressing, etc. The rotation-angle-detecting apparatus has such a shape that, for instance, the radius $r_0$ of the magnet rotor 1 is 25 mm, the distance $r_1$ from a peripheral surface of the magnet rotor 1 to a sensor device center is 3.5 mm, the axial thickness t of a magnet in the magnet rotor 1 is 4 mm, the thickness T of the housing 3 is 2 mm (for instance, formed by punching and pressing a 2-mm-thick plate). It can be used without any problems even at as large distance $r_1$ as 6 mm.

Each pair of spin-valve, giant-magnetoresistive devices 22a-22d shown in FIG. 2(a) are produced by laminating a primer layer (Cr), a pinned layer (Co/Ru/Co), a Cu layer, a free layer (Co/NiFe) and a cap layer (Ta) in this order on a non-magnetic substrate 12a, subjecting them to patterning, and forming a connecting electrode layer and an insulating coating, though not depicted.

[2] Function of Rotation-Angle-Detecting Apparatus (1) Principle

The amplitude of a magnetic flux density generated by a magnet rotor having a limited axial length differs in radial and rotational directions. The directional components $B_\gamma$ and $B_\theta$ of a magnetic flux density of a magnet rotor at an electric angle $\theta_e$ immediately beside the magnet rotor are expressed by the formulae (7) and (8):

$$B_\gamma = B\bot \cos\theta_e = K' \cdot B_{//} \cos\theta_e \quad (7), \text{ and}$$

$$B_\theta = B_{//} \sin\theta_e \quad (8),$$

wherein $B_\gamma$ is a radial-direction component of the magnetic flux density, $B_\theta$ is a rotational-direction component of the magnetic flux density, $B\bot$ is a radial-direction amplitude of the magnetic flux density, $B_{//}$ is a rotational-direction amplitude of the magnetic flux density, and $B\bot/B_{//}=K'$, with harmonic components omitted.

Accordingly, the direction $\theta_{mag}$ of a magnetic flux when the magnet rotor is rotated is expressed by the following formula (9):

$$\theta_{mag} = \tan^{-1}[B_{//} \sin\theta_e/(K' \cdot B_{//} \cos\theta_e)] = \tan^{-1}[\sin\theta_e/(K' \cdot \sin\theta_e)] \quad (9)$$

The output of the sensor device is determined by this angle $\theta_{mag}$. The output $V_x$ of a sensor device having a magnetosensitive axis in a radial direction, and the output $V_y \cdot k$ obtained by multiplying the output $V_y$ of a sensor device having a magnetosensitive axis in a rotational direction by a correction coefficient k are expressed by the formulae (10) and (11):

$$V_x = \cos \theta_{mag} \qquad (10), \text{and}$$

$$V_y \cdot k = k \cdot \sin \theta_{mag} \qquad (11).$$

In this case, the rotation angle $\theta_{meas}$ of the magnet rotor, which is calculated from $V_x$, and $V_y \cdot k$, is expressed by the formula (12):

$$\begin{aligned}\tan\theta_{meas} &= V_y \cdot k / V_x \\ &= k \cdot \sin\theta_{mag}/\cos\theta_{mag} \\ &= k \cdot \tan\theta_{mag} \\ &= k \cdot \tan[\tan^{-1}[\sin\theta_e/(K' \cdot \cos\theta_e)]].\end{aligned} \qquad (12)$$

The omission of tan and $\tan^{-1}$ from the formula (12) provides the following formula (13):

$$\tan \theta_{meas} = k \cdot \sin \theta_e/(K' \cdot \cos \theta_e) = (k/K')\tan \theta_e. \qquad (13)$$

$\theta_{meas}$ determined from the formula (13) is expressed by the formula (14):

$$\theta_{meas} = \tan^{-1}[(k/K')\tan \theta_e] \qquad (14).$$

In the formula (14), as k/K' becomes closer to 1, $\theta_{mean}$ nears $\theta_e$, resulting in smaller errors therebetween. When k is equal to K', k/K'=1, resulting in $\theta_{meas}=\theta_e$ with tan and $\tan^{-1}$ omitted. Namely, if k=K', errors between $\theta_{mean}$ and $\theta_e$ are minimized. When a radial-direction magnetic flux density and a rotational-direction magnetic flux density generated from the magnet rotor have different amplitudes, the detection angle error can be reduced by correcting the voltage amplitude of an output from the sensor device. Though detection is conducted immediately beside the magnet rotor in the above explanation, the position of the sensor device relative to the magnet may be arbitrarily set in a magnetic flux density range in which the sensor device is operated. Even when the sensor is moved away from the magnet in a rotation-axis direction, only an amplitude ratio of magnetic flux densities in two perpendicular magnetosensitive directions in a magnetosensitive plane of the sensor device changes, so that the above magnetic flux density amplitude ratio K' can be determined as a single value.

(2) Correction Coefficient k

The correction coefficient k can be determined by three methods.

(i) Method Using K' Determined from Magnet Shape and Measured Values

A magnetic flux density detected around the magnet rotor when the magnet is rotated is determined by the type and shape of the magnet as a single value. Once the type and shape of the magnet and the position and angle of the sensor are determined in a designing stage, an amplitude ratio K' of two perpendicular magnetic flux density components in a magnetosensitive plane of the sensor bridge is determined. Accordingly, K' is determined by simulation or measurement and used as a correction coefficient k.

(ii) Method Using k' Determined from Sensor Output

When a magnet rotor is rotated at a constant speed with a sensor disposed at a predetermined position, the output of the sensor device has a periodical waveform. Even if the magnet rotor generates a magnetic flux density in a sinusoidal waveform, magnetic flux densities perpendicular to each other in a magnetosensitive plane have different amplitudes, meaning that the sensor output has a waveform containing harmonics. The Fourier-expanded outputs of the sensor bridges are expressed by the following formulae (1-1) and (1-2):

$$V_x = a_1 \cos \theta_{mag} + a_3 \cos 3\theta_{mag} + a_5 \cos 5\theta_{mag} + \ldots \qquad (1\text{-}1), \text{and}$$

$$V_y = b_1 \sin \theta_{mag} + b_3 \sin 3\theta_{mag} + b_5 \sin 5\theta_{mag} + \ldots \qquad (1\text{-}2).$$

In the formulae (1-1) and (1-2), $V_x$ represents the output voltage of a sensor bridge whose magnetosensitive axis is in the radial direction of the magnet rotor, and $V_y$ represents the output voltage of a sensor bridge whose magnetosensitive axis is in the rotational direction of the magnet rotor. Because fifth harmonics or more in each output voltage have only slight influence, up to third harmonics are included to provide an amplitude-adjusting ratio k', which is expressed by the following formula (2):

$$k' = (a_1 - a_3)/(b_1 + b_3) \qquad (2).$$

This amplitude-adjusting ratio k' is used as a correction coefficient k.

The relation between the formulae (1-1) and (1-2) and the formula (2) will be explained in detail. $V_x$ and $V_y$ are obtained by normalizing the amplitudes of the output voltages of sensor bridges expressed by the formulae (1-1) and (1-2), and the amplitude-adjusting ratio k' is determined from basic wave components and third harmonics of $V_x$ and $V_y$ by the formula (2), wherein $a_1$ and $a_3$ are Fourier coefficients of basic and third harmonic waves of the output $V_x$, and $b_1$ and $b_3$ are Fourier coefficients of basic and third harmonic waves of the output $V_y$. This amplitude-adjusting ratio k' is equal to the amplitude ratio K' of a magnetic flux density as described below.

Figure 26:
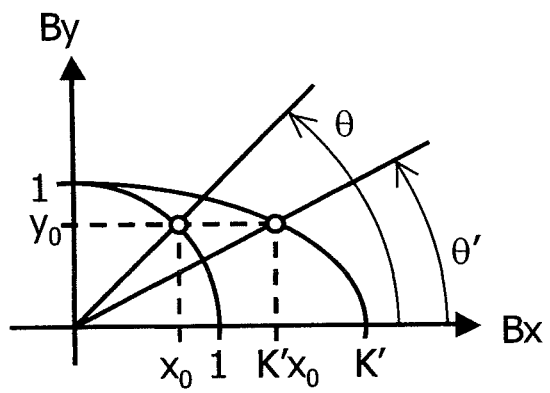
FIG. 26 is a graph for explaining the method of calculating an amplitude-adjusting coefficient K'.
Figure 27:
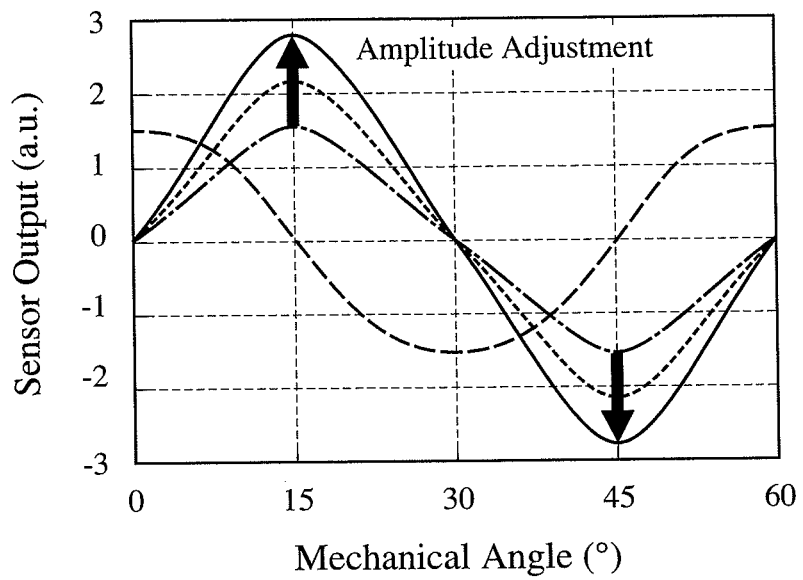
FIG. 27 is a graph showing waveforms of the sensor output voltage when the correction coefficient k is changed.

The instantaneous value of a magnetic flux density in a direction y, which is normalized by the magnetic flux density amplitude in a rotational direction, is regarded as $y_0$. The instantaneous value of a magnetic flux density in a direction x is regarded as $x_0$ when its amplitude is equal to that in the direction y. Thus, when the amplitude of a magnetic flux density in a direction x is multiplied by K', the instantaneous value of a magnetic flux density in a direction x is K'$x_0$, as shown in FIG. 26. Namely, a point ($x_0$, $y_0$) is on a circle represented by $x = \cos \theta$, and $y = \sin \theta$, and a point (K'$x_0$, $y_0$) is on an ellipse represented by $x = K' \cdot \cos \theta'$, and $y = \sin \theta'$. Here, the relation of $x_0$, $y_0$, K', $\theta$ and $\theta'$ are expressed by the following formulae (15-1) and (15-2):

$$\tan \theta' = y_0/(K'x_0) \qquad (15\text{-}1), \text{and}$$

$$\tan \theta = y_0/x_0 \qquad (15\text{-}2).$$

The relation of $\tan \theta = K' \cdot \tan \theta'$ is derived from these formulae. As is clear from FIG. 26, the following formulae (16-1) to (16-4) are derived:

$$\cos \theta' = K'x_0/(K'^2 x_0^2 + y_0^2)^{1/2} \qquad (16\text{-}1),$$

$$\cos \theta = x_0/(x_0^2 + y_0^2)^{1/2} \qquad (16\text{-}2),$$

$$\sin \theta' = y_0/(K'^2 x_0^2 + y_0^2)^{1/2} \qquad (16\text{-}3), \text{and}$$

$$\sin \theta = y_0/(x_0^2 + y_0^2)^{1/2} \qquad (16\text{-}4).$$

Derived from the formulae (16-1) to (16-4) is the following formula (17):

$$\begin{aligned}\cos\theta' &= K'x_0/(K'^2x_0^2+y_0^2)^{1/2} \\ &= [K'x_0/(K'^2x_0^2+y_0^2)^{1/2}]\cdot[(x_0^2+y_0^2)^{1/2}/(x_0^2+y_0^2)^{1/2}] \\ &= [K'(x_0^2+y_0^2)^{1/2}/(K'^2x_0^2+y_0^2)^{1/2}]\cdot[x_0/(x_0^2+y_0^2)^{1/2}] \\ &= [K'(x_0^2+y_0^2)^{1/2}/(K'^2x_0^2+y_0^2)^{1/2}]\cdot\cos\theta.\end{aligned} \quad (17)$$

Similarly, the calculation of sin θ derives the formula (18):

$$\sin\theta'=[(x_0^2+y_0^2)^{1/2}/(K'^2x_0^2+y_0^2)^{1/2}]\cdot\sin\theta \quad (18)$$

Defining C by the formula (19) of $C=(x_0^2+y_0^2)^{1/2}/(K'^2x_0^2+y_0^2)^{1/2}$, cos θ' and sin θ' are transformed to cos θ'=K'·C·cos θ, and sin θ'=C·sin θ, respectively. These correspond to sensor bridge outputs (normalized output voltages), which are $V_x$=cos θ', and $V_y$=sin θ'.

With only AC components of $V_x$ and $V_y$ expanded to Fourier series, only significant terms are used to obtain the following formulae (20) and (21):

$$V_x = a_1\cos\theta_{mag}+a_3\cos 3\theta_{mag}+a_5\cos 5\theta_{mag}+\ldots \quad (20),\text{ and}$$

$$V_y = b_1\sin\theta_{mag}+b_3\sin 3\theta_{mag}+b_5\sin 5\theta_{mag}+\ldots \quad (21).$$

$a_1$, $a_3$, $b_1$ and $b_3$ in the above formulae are Fourier coefficients expressed by the following formulae (22-1) to (22-4):

$$a_1 = \frac{1}{\pi}\int_0^{2\pi} K'\cdot C\cos\theta\cos\theta\,d\theta, \quad (22\text{-}1)$$

$$a_3 = \frac{1}{\pi}\int_0^{2\pi} K'\cdot C\cos\theta\cos 3\theta\,d\theta, \quad (22\text{-}2)$$

$$b_1 = \frac{1}{\pi}\int_0^{2\pi} C\sin\theta\sin\theta\,d\theta,\text{ and} \quad (22\text{-}3)$$

$$b_3 = \frac{1}{\pi}\int_0^{2\pi} C\sin\theta\sin 3\theta\,d\theta. \quad (22\text{-}4)$$

Accordingly, the value of $(a_1-a_3)/(b_1+b_3)$ is expressed by the formula (23):

$$\frac{a_1-a_3}{b_1+b_3} = \frac{\frac{1}{\pi}\int_0^{2\pi}K'\cdot C\cos\theta\cos\theta\,d\theta - \frac{1}{\pi}\int_0^{2\pi}K'\cdot C\cos\theta\cos 3\theta\,d\theta}{\frac{1}{\pi}\int_0^{2\pi}C\sin\theta\sin\theta\,d\theta + \frac{1}{\pi}\int_0^{2\pi}C\sin\theta\sin 3\theta\,d\theta}$$

$$= K'\frac{\int_0^{2\pi}C\cos\theta(\cos\theta-\cos 3\theta)\,d\theta}{\int_0^{2\pi}C\sin\theta(\sin\theta+\sin 3\theta)\,d\theta}. \quad (23)$$

The formula in the integration on the denominator is transformed as shown in the formula (24):

$$\begin{aligned}C\sin\theta(\sin\theta+\sin 3\theta) &= C\sin\theta(\sin\theta+3\sin\theta-4\sin^3\theta) \\ &= C\sin\theta\cdot 4(\sin\theta-\sin^3\theta) \\ &= 4C\sin^2\theta(1-\sin^2\theta) \\ &= 4C\sin^2\theta\cos^2\theta.\end{aligned} \quad (24)$$

The formula in the integration on the numerator is transformed as shown in the formula (25):

$$\begin{aligned}C\cos\theta(\cos\theta+\cos 3\theta) &= C\cos\theta[\cos\theta-(4\cos^3\theta-3\cos\theta)] \\ &= C\cos\theta\cdot 4(\cos\theta-\cos^3\theta) \\ &= 4C\cos^2\theta(1-\cos^2\theta) \\ &= 4C\cos^2\theta\sin^2\theta.\end{aligned} \quad (25)$$

Because the integration formulae on the numerator and the denominator are equal, the formula (23) is transformed to the formula (26):

$$(a_1-a_3)/(b_1+b_3)=K'=k' \quad (26).$$

The amplitude-adjusting ratio k' thus determined from the Fourier coefficients of a basic wave and a third harmonic of the output waveform of a bridge of spin-valve, giant-magnetoresistive (SVGMR) devices having perpendicular magnetosensitive axes is used as a correction coefficient k.

When the waveform of $V_y$ has a phase preceding about 90° from the waveform of $V_x$, the correction coefficient k can be expressed by the formula (27):

$$k=(|a_1|-|a_3|)/(|b_1|+|b_3|) \quad (27).$$

With sin and cos interchanged when expanded to Fourier series, $V_x$ and $V_y$ can be expressed as described below: Namely, with only AC components of $V_x$ and $V_y$ taken into account in Fourier expansion, only significant terms are used to obtain the formulae (28) and (29):

$$V_x=c_1\sin\theta_{mag}+c_3\sin 3\theta_{mag}+c_5\sin 5\theta_{mag}+\ldots \quad (28),\text{ and}$$

$$V_y=d_1\cos\theta_{mag}+d_3\cos 3\theta_{mag}+d_5\cos 5\theta_{mag}+\ldots \quad (29).$$

In this case, though proof is omitted, k is expressed by the formula (30):

$$k=(c_1+c_3)/(d_1-d_3) \quad (30).$$

Because the phase relation of $V_x$ and $V_y$ varies depending on the arrangement of a sensor and the rotation direction of a rotor, one or both of the first Fourier coefficients of $V_x$ and $V_y$ may be minus. In that case, too, because the signs of the first and third coefficients change simultaneously in the same formula, the use of the absolute value of the formula makes k a positive number.

(iii) Method of Determining k from Change Ratio of Mechanical Angle Error

Figure 28:
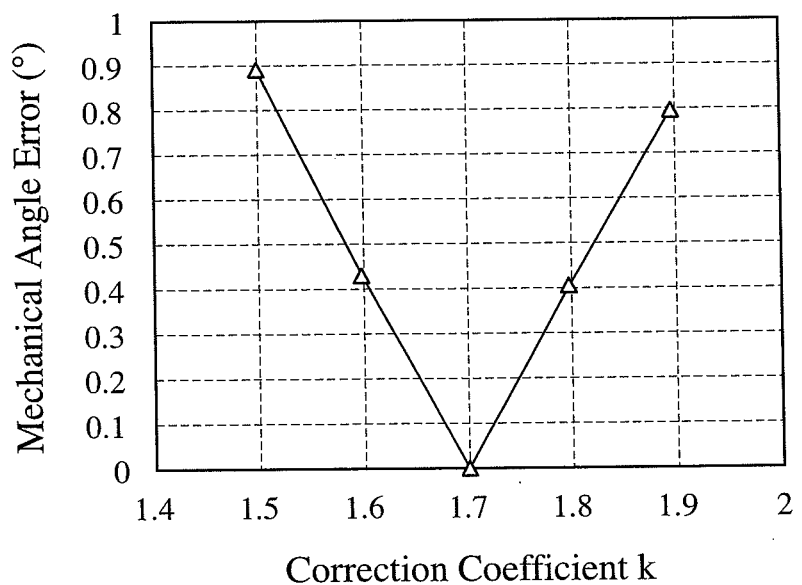
FIG. 28 is a graph showing the relation between the correction coefficient k and the mechanical angle error.

Actual output voltage is multiplied by two or more (preferably three or more) arbitrary values of the correction coefficient k to calculate the mechanical angle, and compared with the actual mechanical angle of the magnet rotor to determine mechanical angle errors, from each of which the optimum correction coefficient k is obtained. In this case, the relation between the assumed two or more k values and the corresponding mechanical angle error is preferably determined by a least squares method using a proper approximation formula (for instance, linear approximation). For instance, the mechanical angle error is determined by using five correction coefficients ($k_1$=1.5, $k_2$=1.6, $k_3$=1.7, $k_4$=1.8, and $k_5$=1.9) assumed as shown in FIG. 28, and a graph is depicted with the correction coefficients k on the axis of abscissas and the mechanical angle errors on the axis of ordinates, to draw a straight line approximating the measured values to determine the correction coefficient k at a mechanical angle error of 0°. In the case of FIG. 28, the mechanical angle error is 0° at k=1.7.

(3) Embodiments (i) Calculation of Correction Coefficient k

Figure 3:
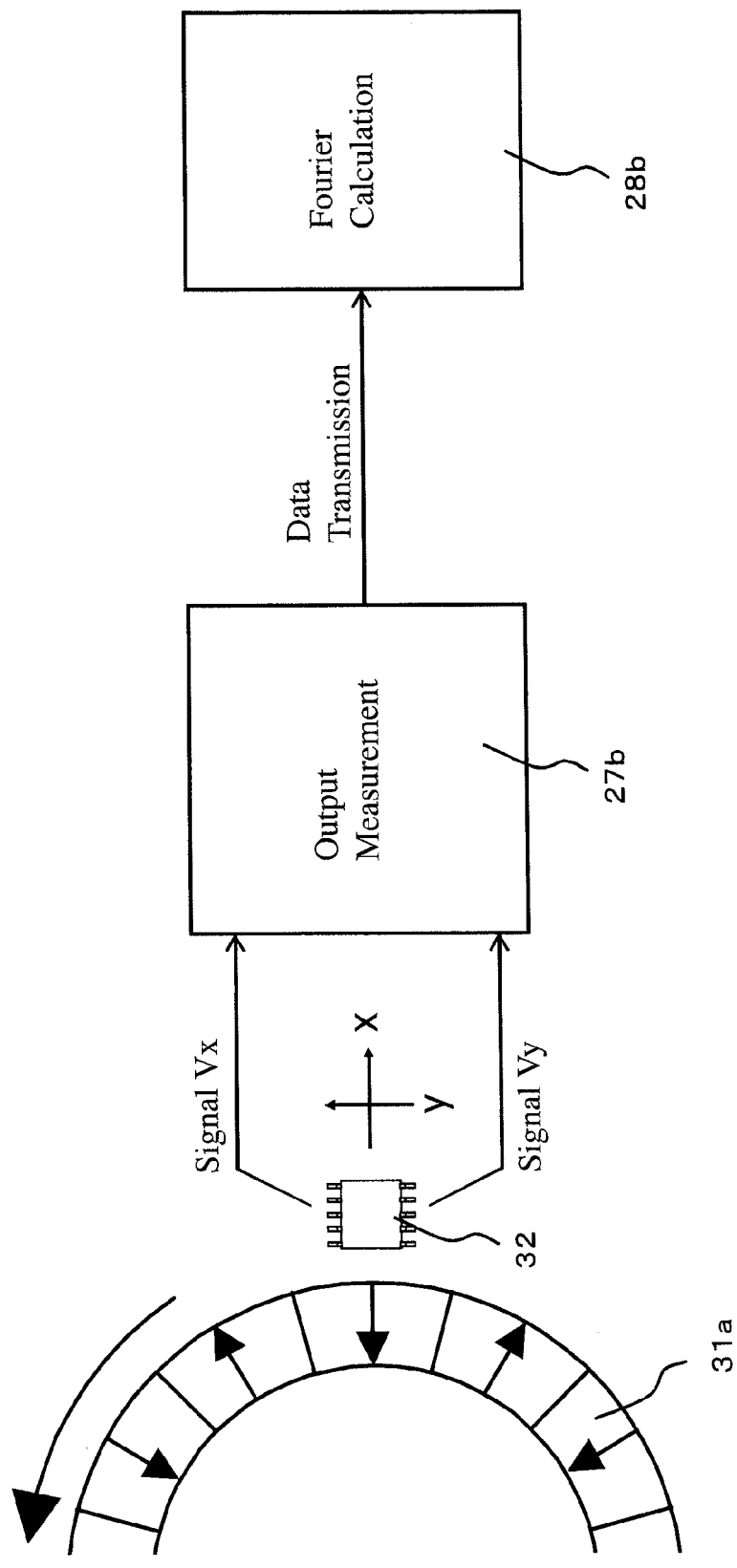
FIG. 3 is a schematic view showing one example of the methods for calculating a correction coefficient k.

The correction coefficient k can be calculated, for instance, by the method schematically shown in FIG. 3. The direction of a magnetic flux from the rotating magnet rotor 31a is detected by a sensor device 32 at a desired position near the magnet rotor, and the output voltages ($V_x$, $V_y$) of the sensor bridges are measured by an oscilloscope 27b. The resultant measured values are input to a personal computer 28b to calculate k' by Fourier expansion in one period of the electric angle using the formulae (1-1), (1-2) and (2). Because correction can be made after the arrangement of the sensor device 32 in this method, increase in the mechanical angle error due to the positional displacement can be suppressed, convenient practically. Usually, the correction coefficient k may be the same as k'.

(ii) Amplitude Correction Method 1

Figure 4:
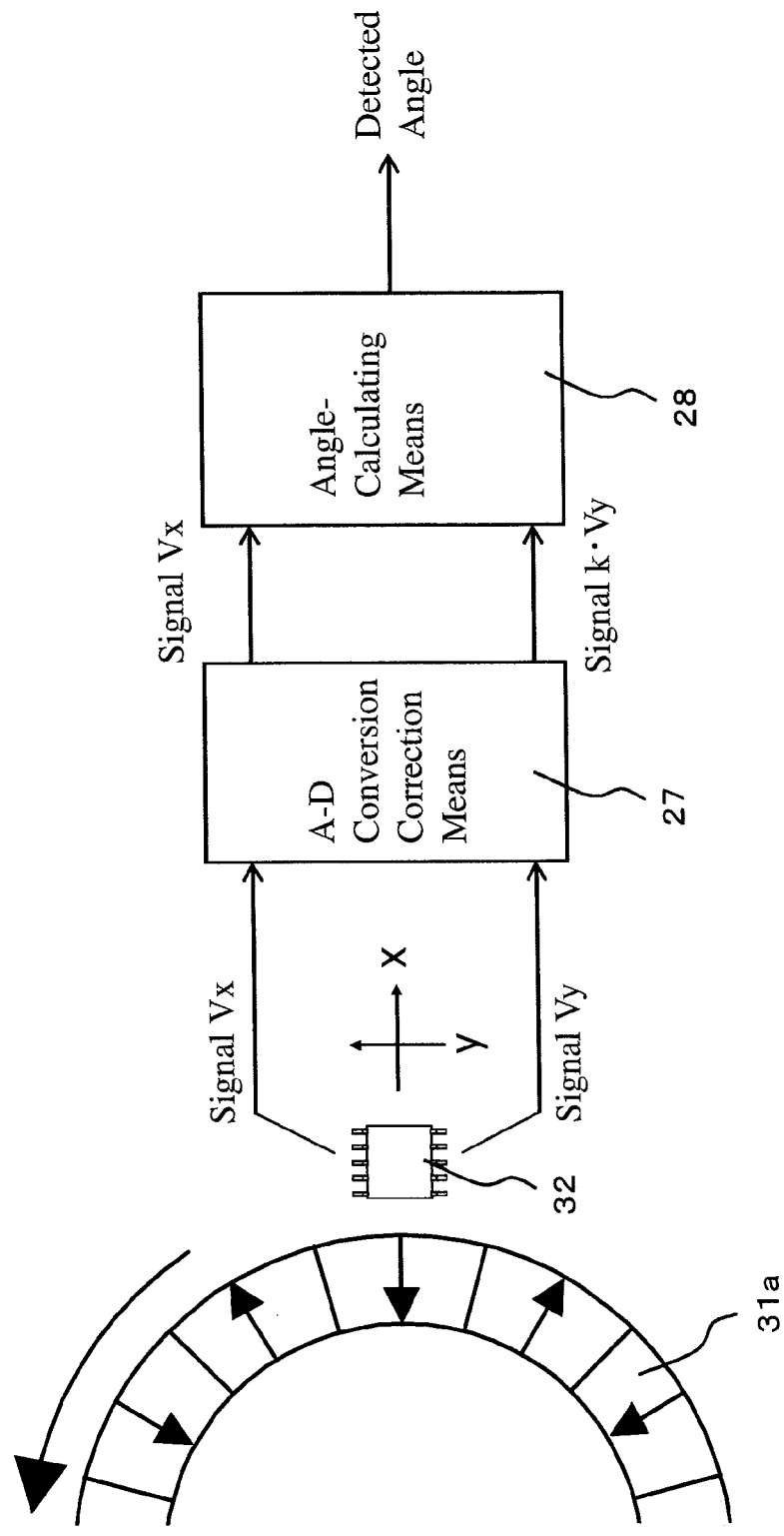
FIG. 4 is a schematic view showing one example of the rotation-angle-detecting apparatuses.

FIG. 4 schematically shows one example of the rotation-angle-detecting apparatuses. The direction of a magnetic flux from the rotating magnet rotor 31a is detected by a sensor device 32 disposed at a desired position near a magnet with six pole pairs, and the output voltages ($V_x$, $V_y$) of the sensor bridges are subjected to A-D conversion (analog-digital conversion). After the conversion, $V_y$ is multiplied by the previously calculated correction coefficient k, and these output voltages ($V_x$, $k \cdot V_y$) are subjected to arctangent calculation by an angle-calculating means 28 to determine the angle. Because voltage adjustment can be made digitally in this method, upstream electronic circuits may have simple structures, and the measurement range of A-D conversion can be maximized.

(iii) Amplitude Correction Method 2

Figure 5:
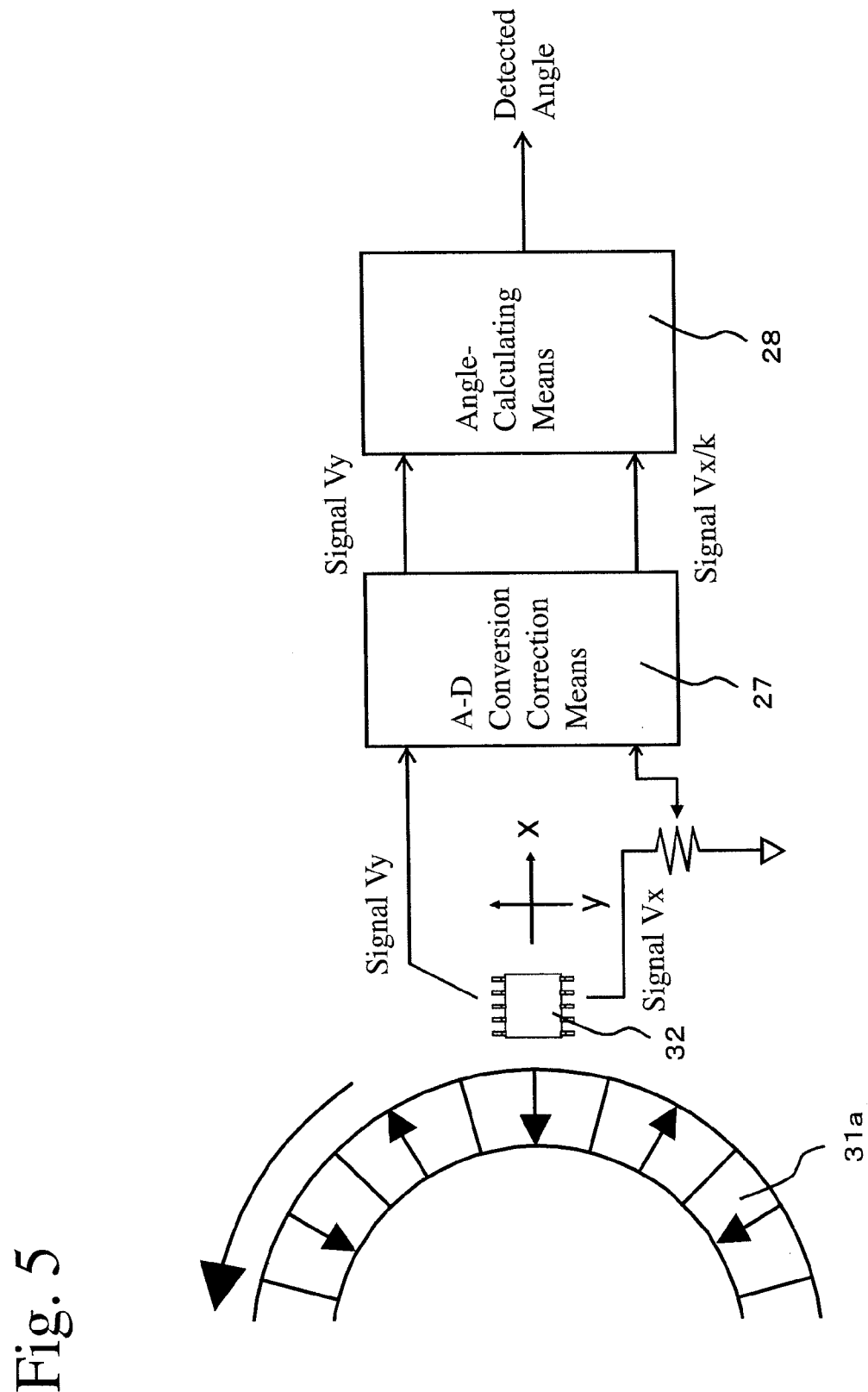
FIG. 5 is a schematic view showing another example of the rotation-angle-detecting apparatuses.

FIG. 5 schematically shows another example of the rotation-angle-detecting apparatuses. The direction of a magnetic flux from the rotating magnet rotor 31a is detected by a sensor device 32 disposed at a desired position near a magnet with six pole pairs, and only the output voltage $V_x$ of the sensor bridge is divided by the previously calculated correction coefficient k (divided by a variable resistor), and then input to an A-D conversion correction means 27. These output voltages ($V_x/k$, $V_y$) are subjected to arctangent calculation by the angle-calculating means 28 to determine the angle. By this method, the correction coefficient k can be determined while evaluating the detection angle and the actual rotation angle.

(iv) Amplitude Correction Method 3

Figure 6:
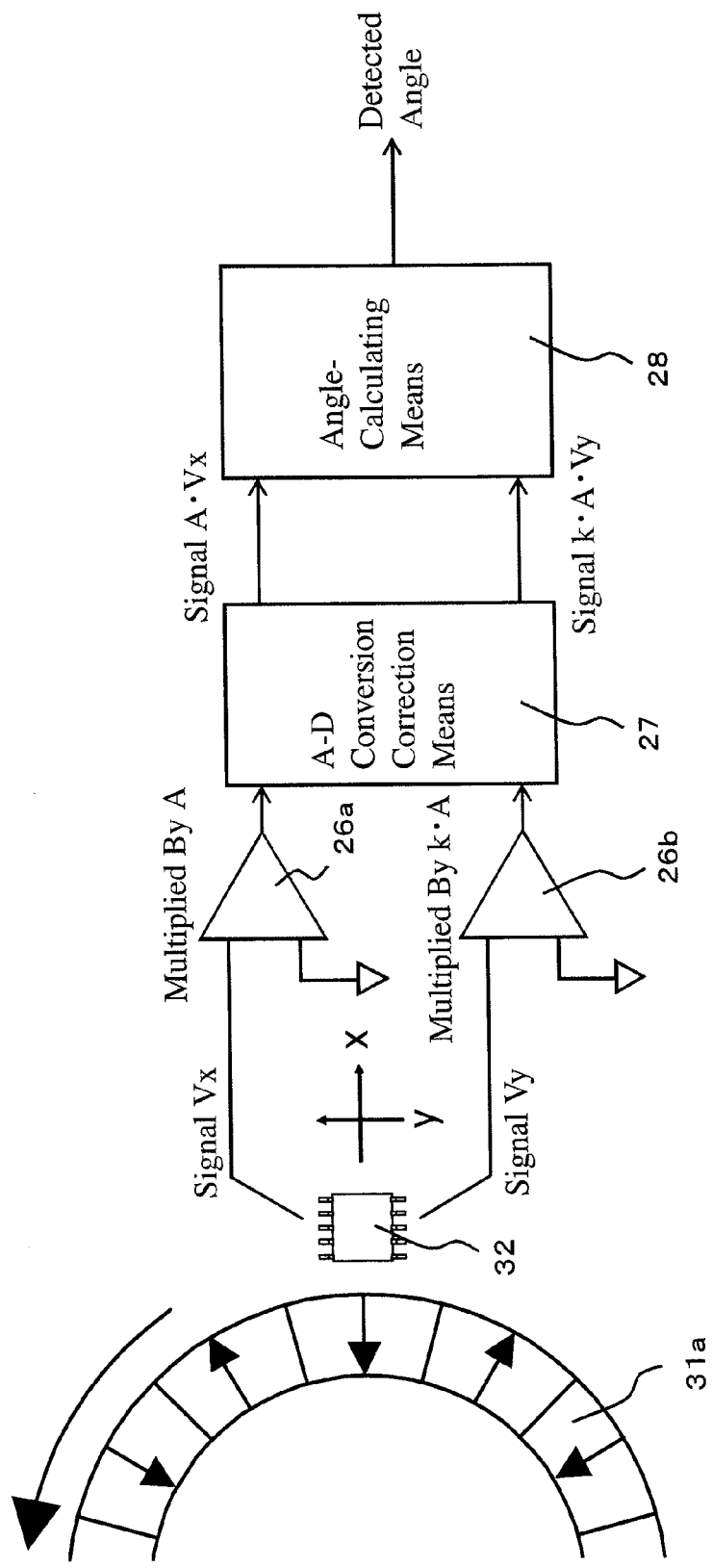
FIG. 6 is a schematic view showing a further example of the rotation-angle-detecting apparatuses.

FIG. 6 schematically shows a further example of the rotation-angle-detecting apparatuses. The direction of a magnetic flux from the rotating magnet rotor 31a is detected by a sensor device 32 disposed at a desired position near a magnet with six pole pairs, and the output voltages ($V_x$, $V_y$) of the sensor bridges are input to the amplifier circuits of operational amplifiers 26a, 26b. The amplification ratio of the voltage $V_x$ is A, and the amplification ratio of the voltage $V_y$ is adjusted to A·k. Thereafter, the output voltages ($A \cdot V_x$, $k \cdot A \cdot V_y$) are input to the A-D conversion correction means 27, and subjected to arctangent calculation by the angle-calculating means 28 to determine the angle. Because this method can amplify sensor bridge outputs, it is advantageous in that the differential operation of the amplifier means can improve noise resistance, etc.

The present invention will be explained in further detail referring to Examples below, without intention of restricting the present invention thereto.

EXAMPLE 1

Figure 7A:
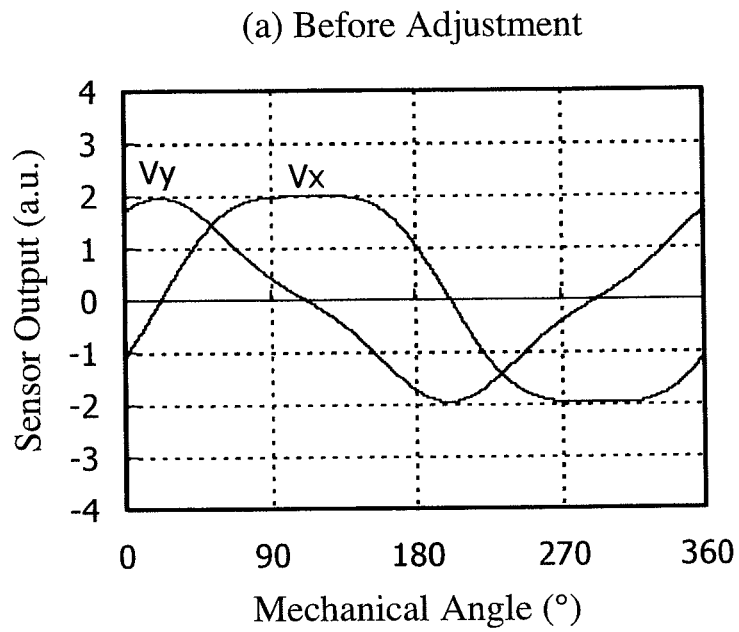
FIG. 7(a) is a graph showing a sensor output from the rotation-angle-detecting apparatus of Example 1 before adjusting the voltage.
Figure 7B:
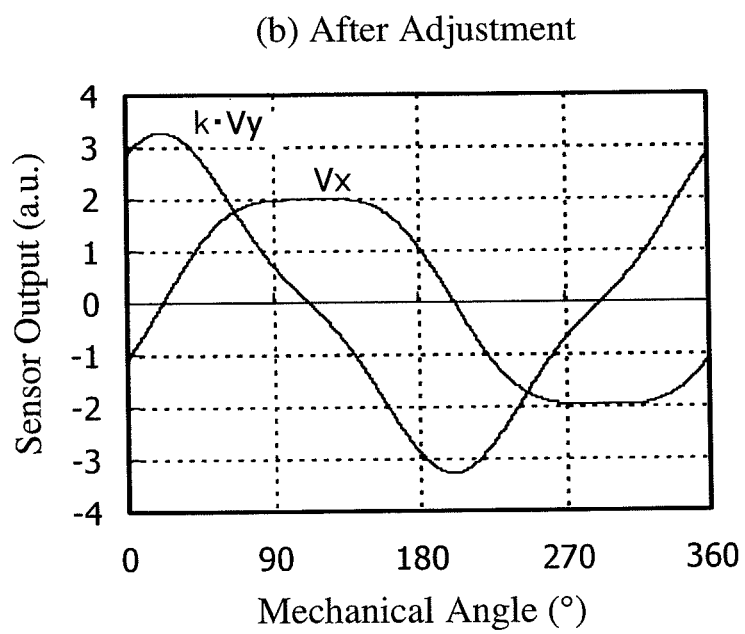
FIG. 7(b) is a graph showing a sensor output from the rotation-angle-detecting apparatus of Example 1 after adjusting the voltage.
Figure 7C:
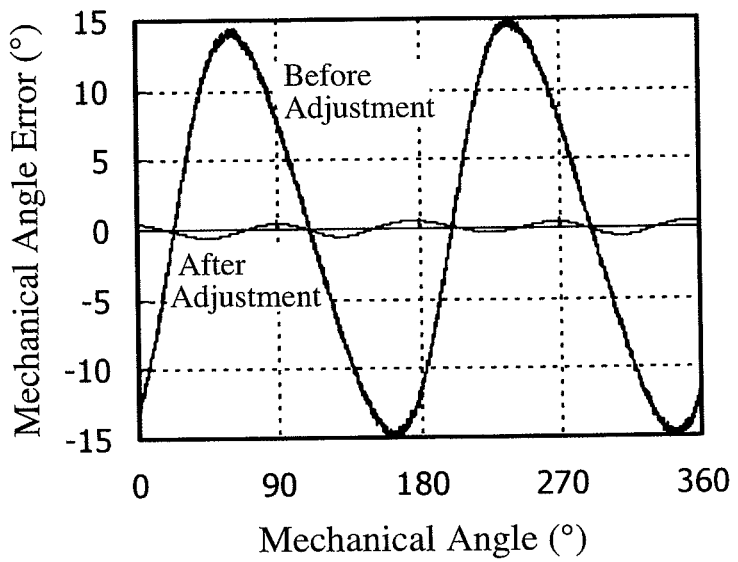
FIG. 7(c) is a graph showing angle errors of the rotation-angle-detecting apparatus of Example 1 before and after adjusting the voltage.

A rotation-angle-detecting apparatus comprising a magnet rotor with one pole pair was produced. The magnet rotor was constituted by a bonded Nd—Fe—B magnet having a diameter of 26 mm and an axial thickness of 5 mm, and the sensor device was disposed 5 mm away from a peripheral surface of the magnet. Because the magnet with one pole pair was used, one period of sensor bridge output (not adjusted) was obtained from one rotation of the magnet rotor (mechanical angle 360° as shown in FIG. 7(a). This output was expanded to Fourier series to obtain k'=1.70 by the formulae (1-1), (1-2) and (2). Using this k' as a correction coefficient k, $V_y$ was multiplied by k to obtain the output $k \cdot V_y$, as shown in FIG. 7(b). The output waveforms shown in FIGS. 7(a) and 7(b) were subjected to arctangent calculation to evaluate the angle errors, so that the mechanical angle error, which was about ±15° before voltage adjustment, was reduced to about ±0.5° by voltage adjustment as shown in FIG. 7(c).

EXAMPLE 2

Figure 8A:
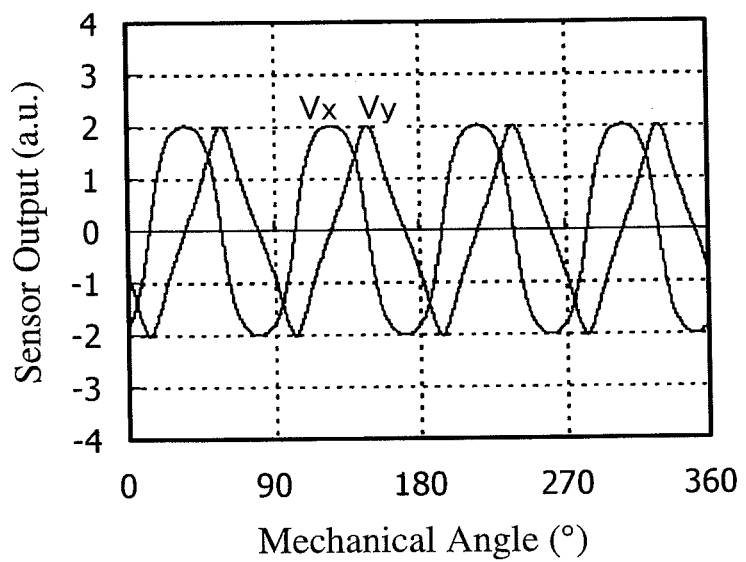
FIG. 8(a) is a graph showing the sensor output of the rotation-angle-detecting apparatus of Example 2 before adjusting the voltage.
Figure 8B:
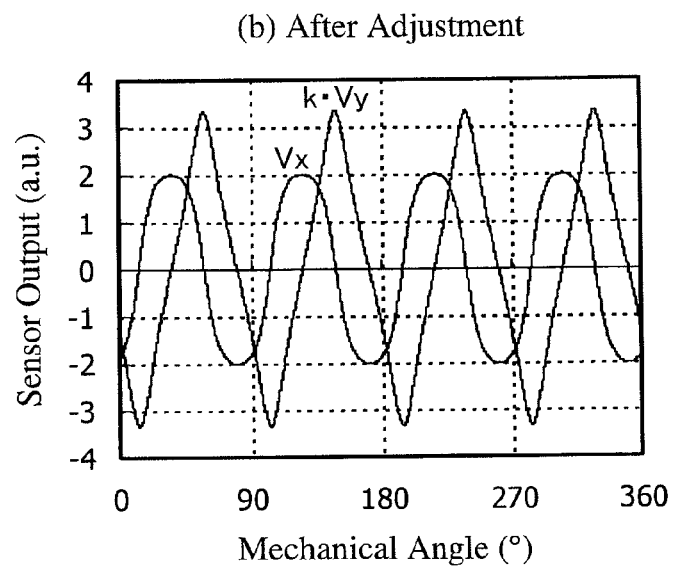
FIG. 8(b) is a graph showing the sensor output of the rotation-angle-detecting apparatus of Example 2 after adjusting the voltage.
Figure 8C:
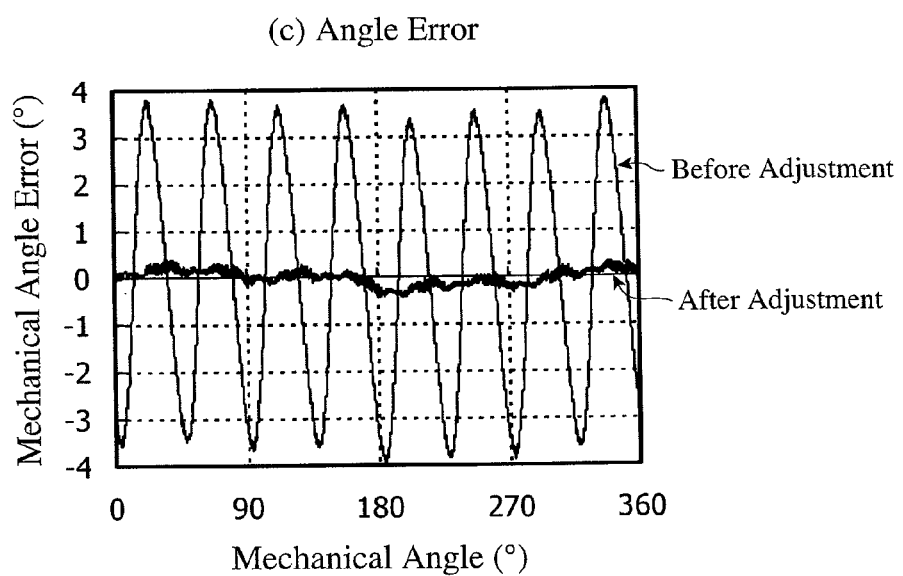
FIG. 8(c) is a graph showing the angle errors of the rotation-angle-detecting apparatus of Example 2 before and after adjusting the voltage.

A rotation-angle-detecting apparatus comprising a magnet rotor with four pole pairs was produced. The magnet rotor was constituted by a bonded Nd—Fe—B magnet having an outer diameter of 40 mm, an inner diameter of 34 mm and an axial thickness of 4 mm, and the sensor device was disposed 5 mm away from a peripheral surface of the magnet. Because the magnet with four pole pairs was used, four periods of sensor bridge output (before voltage adjustment) was obtained from one rotation of the magnet rotor (mechanical angle: 360° as shown in FIG. 8(a). This output in one period of the electric angle (mechanical angle: 90° was expanded to Fourier series to obtain k'=1.67 as in Example 1. $V_y$ was multiplied by this k' as a correction coefficient k to obtain the output $k \cdot V_y$, as shown in FIG. 8(b). The output waveforms shown in FIGS. 8(a) and 8(b) were subjected to arctangent calculation to evaluate the angle error, so that the mechanical angle error, which was about ±3.5° before voltage adjustment, was reduced to about ±0.4° by voltage adjustment as shown in FIG. 8(c).

EXAMPLE 3

Figure 9A:
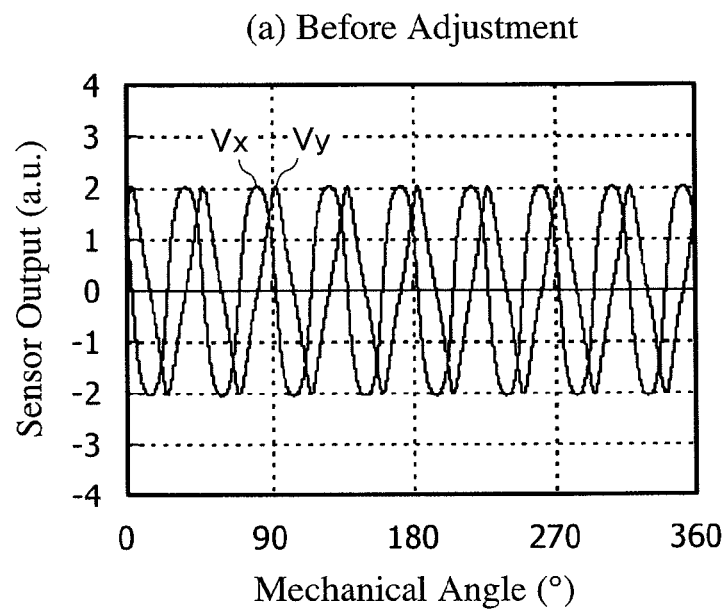
FIG. 9(a) is a graph showing the sensor output of the rotation-angle-detecting apparatus of Example 3 before adjusting the voltage.
Figure 9B:
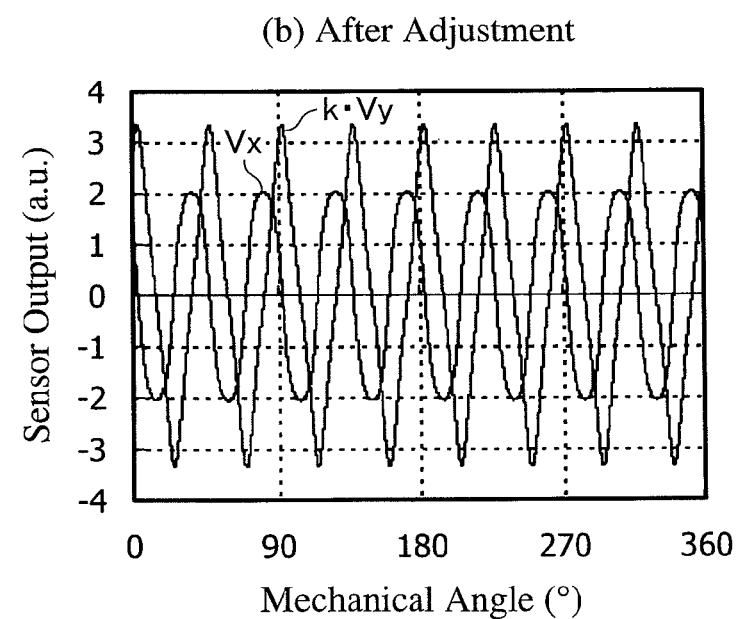
FIG. 9(b) is a graph showing the sensor output of the rotation-angle-detecting apparatus of Example 3 after adjusting the voltage.
Figure 9C:
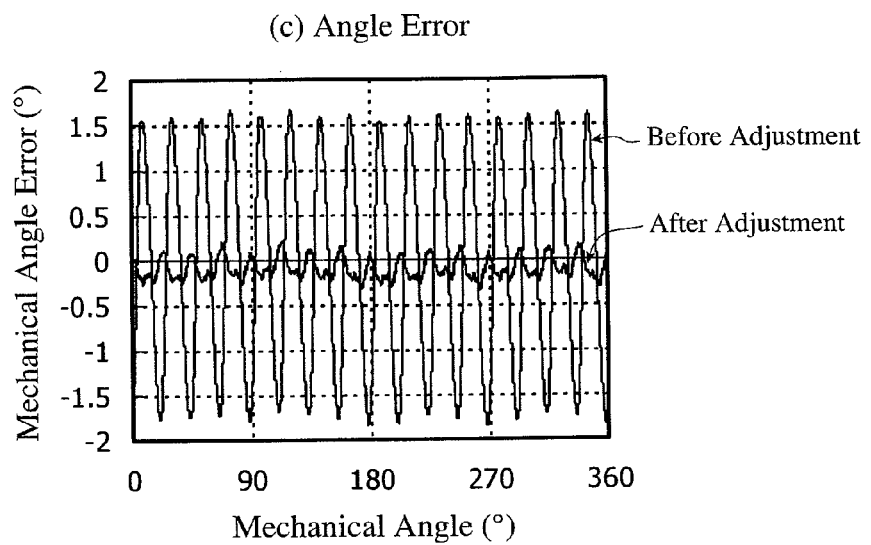
FIG. 9(c) is a graph showing the angle errors of the rotation-angle-detecting apparatus of Example 3 before and after adjusting the voltage.

A rotation-angle-detecting apparatus comprising a magnet rotor with eight pole pairs was produced. The magnet rotor was constituted by a bonded Nd—Fe—B magnet having an outer diameter of 120 mm, an inner diameter of 112 mm and an axial thickness of 6 mm, and the sensor device was disposed 6 mm away from a peripheral surface of the magnet. Because the magnet with eight pole pairs was used, eight periods of sensor bridge output (before voltage adjustment) was obtained from one rotation of the magnet rotor (mechanical angle: 360° as shown in FIG. 9(a). This output in one period of the electric angle (mechanical angle: 45° was expanded to Fourier series to obtain k'=1.67 as in Example 1. $V_y$ was multiplied by this k' as a correction coefficient k to obtain the output $k \cdot V_y$ as shown in FIG. 9(b). The output waveforms shown in FIGS. 9(a) and 9(b) were subjected to arctangent calculation to evaluate the angle error, so that the mechanical angle error, which was about ±1.8° before voltage adjustment, was reduced to about ±0.2° by voltage adjustment as shown in FIG. 9(c).

Errors Generated by Variation of Voltage-Adjusting Coefficient

Figure 10:
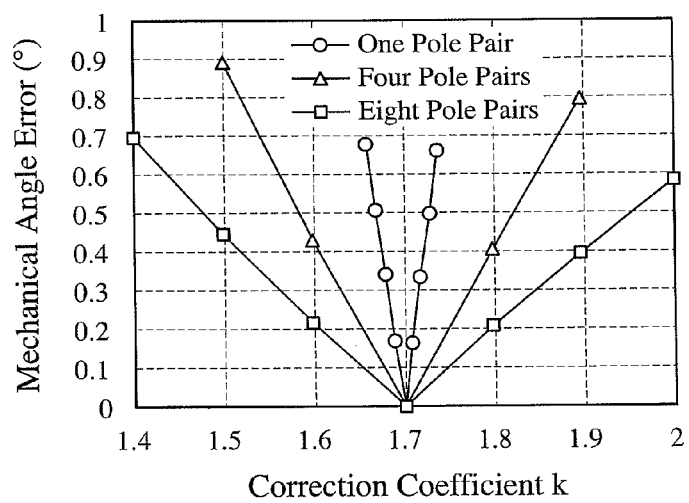
FIG. 10 is a graph showing mechanical angle errors when the correction coefficient k varies.
Figure 11:
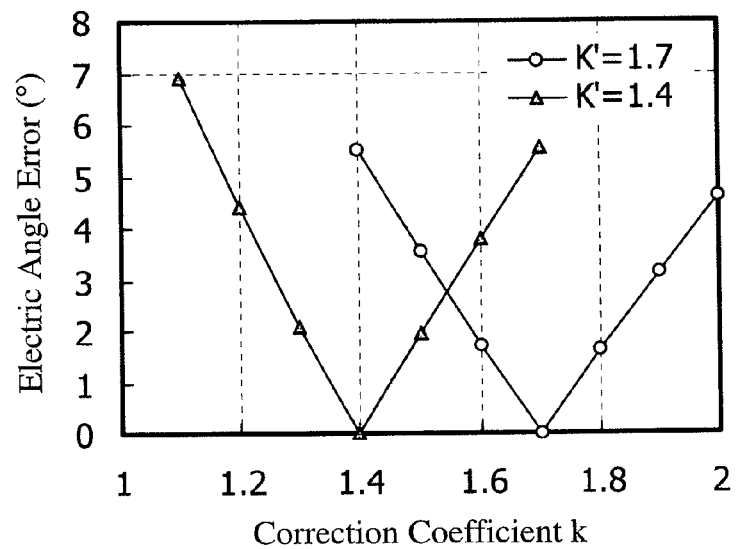
FIG. 11 is a graph showing electric angle errors when the correction coefficient k varies.

In the rotation-angle-detecting apparatus of the present invention comprising a magnet rotor whose number N of pole pairs was 1, 4 and 8, respectively, the mechanical angle error calculated with a changing correction coefficient k is shown in FIG. 10. The amplitude ratio K' of perpendicular magnetic flux density distributions on a magnetosensitive plane of the sensor bridge was 1.70. In any magnet rotor having the above number of pole pairs, the mechanical angle error was minimized by making the correction coefficient k equal to the magnetic flux density amplitude ratio K'. Increase in the number N of pole pairs makes the mechanical angle error 1/N, suppressing increase in errors due to the deviation of the correction coefficient k. For instance, when the absolute value of the mechanical angle error should be 5° or less, acceptable deviation of the correction coefficient k is about ±0.3N, wherein N is the number of pole pairs in the magnet rotor. Accordingly, k is preferably in a range of K'±0.3N. The range of k is more preferably K'±0.2N, most preferably K'±0.1N. Further, when the absolute value of the mechanical angle error should be 1° or less, acceptable deviation of the correction coefficient k is about ±0.06N, wherein N is the number of pole pairs in the magnet rotor. Larger acceptable deviation makes the apparatus more useful industrially. Further, to make the absolute value of the mechanical angle error 0.5° or less, acceptable deviation of the correction coefficient k should be ±0.03N. The electric angle errors calculated with a changing correction coefficient k at the magnetic flux density amplitude ratios K' of 1.4 and 1.7 are shown in FIG. 11. The angle errors were substantially in the same range at both magnetic flux density amplitude ratios Ks' of 1.7 and 1.4.

EXAMPLE 4

Figure 12:
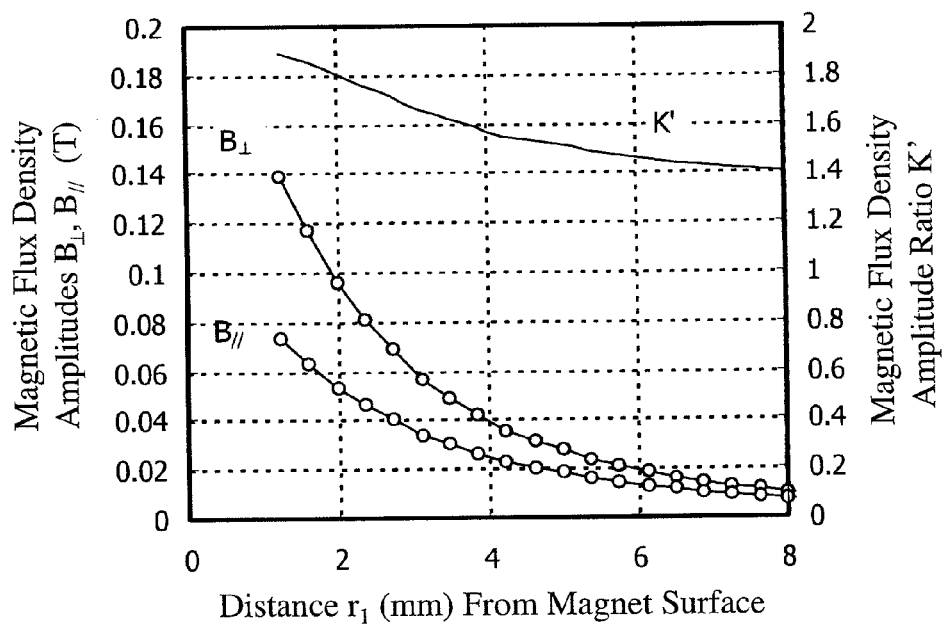
FIG. 12 is a graph showing a radial-direction magnetic flux density $B\perp$, a rotational-direction magnetic flux density $B_{//}$ and a magnetic flux density amplitude ratio K' of the magnet when the sensor moves in the X-axis direction (perpendicular to the rotation axis).

With respect to a magnet rotor with six pole pairs (bonded NdFeB magnet having an outer diameter of 50 mm, an inner diameter of 45 mm and an axial thickness of 4 mm), the dependence of a radial-direction magnetic flux density amplitude $B\perp$, a rotational-direction magnetic flux density amplitude $B_{//}$, and a magnetic flux density amplitude ratio K' determined from them on a measurement position were evaluated. FIG. 12 shows the measurement results of $B\perp$, $B_{//}$ and K' at a position separate from a reference position (center in a magnet thickness direction on a peripheral surface of the magnet rotor) by $r_1$ in the X-axis direction (perpendicular to a rotation axis). The density amplitude of a magnetic flux generated from the magnet rotor was larger in $B\perp$, and the magnetic flux density amplitude ratio K' was 1.4-1.9 in a measurement range.

Figure 13:
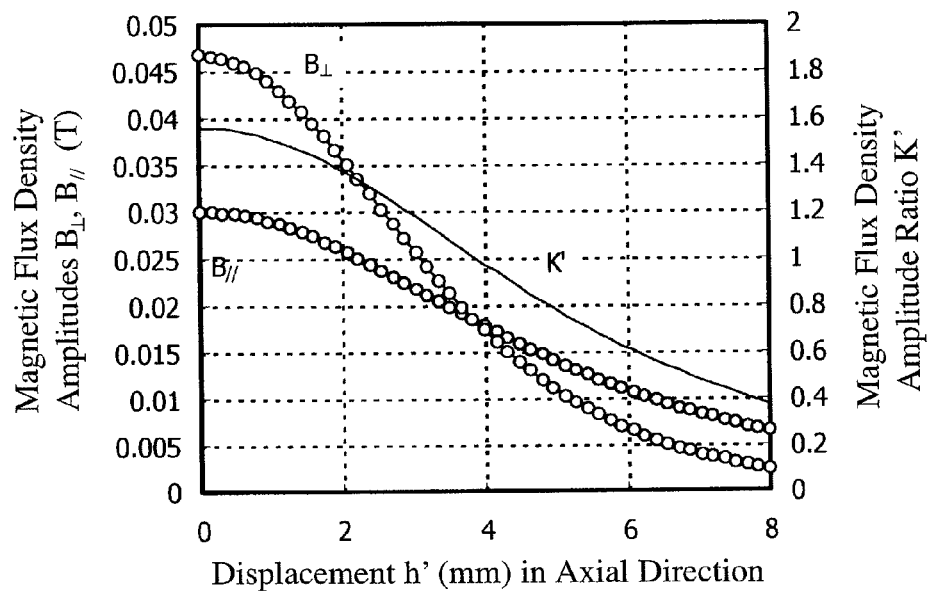
FIG. 13 is a graph showing a radial-direction magnetic flux density $B\perp$, a rotational-direction magnetic flux density $B_{//}$ and a magnetic flux density amplitude ratio K' of the magnet when the sensor moves in the Z-axis direction (rotation-axis direction).

Further, FIG. 13 shows the measurement results of $B\perp$, $B_{//}$ and K' at a position displaced from a position of $r_1$=3.5 mm by h' in the Z-axis direction (rotation-axis direction). As the value of h' increased, $B\perp$ drastically decreased, so that K' also decreased largely. As a result, $B_{//}$ was larger than $B\perp$ at z≥4 mm.

When K' obtained at an arbitrary measurement position $r_1$ was used as a correction coefficient k in the amplitude correction methods 1-3, rotation-angle-detecting apparatuses comprising these magnet rotors and sensor devices had reduced angle errors. It has thus been found that once the shape of a magnet rotor, the number of pole pairs and the position of a sensor device are set, the magnetic flux density amplitude ratio K' can be easily determined, and the use thereof as a correction coefficient k can reduce the angle error of a rotation-angle-detecting apparatus.

Figure 14A:
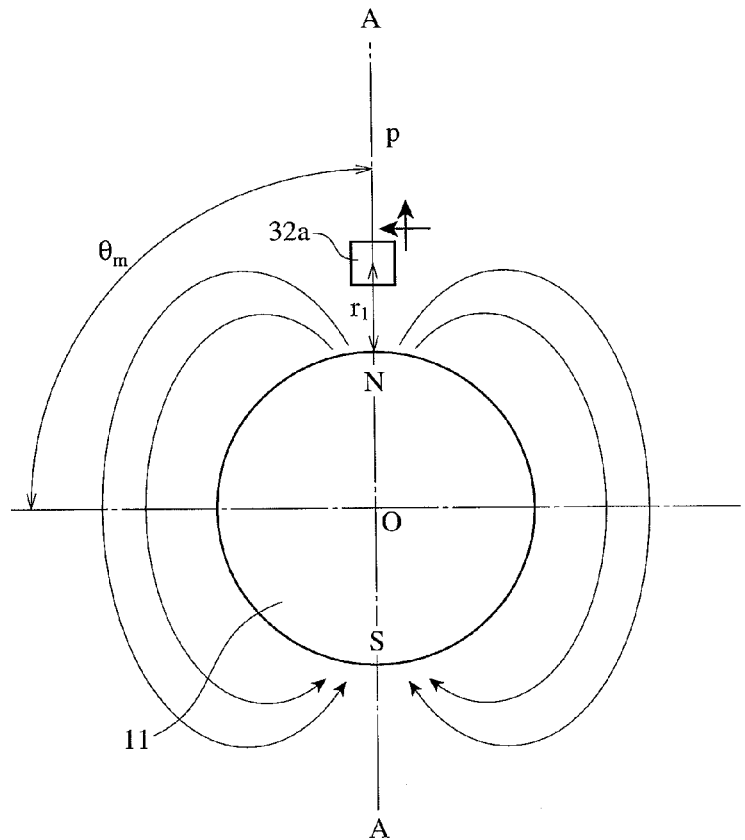
FIG. 14(a) is a schematic view showing the positional relation between the magnetic flux of a magnet with one pole pair and a sensor device.
Figure 14B:
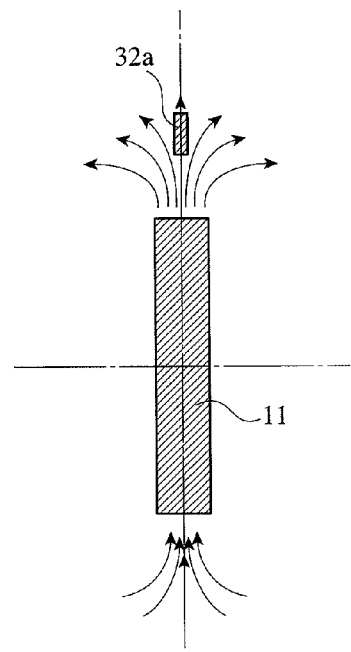
FIG. 14(b) is a cross-sectional view taken along the line A-A in FIG. 14(a).

FIGS. 14(a) and 14(b) show the positional relation of a magnetic flux and a sensor device 32a when a magnet with one pole pair is used as a magnet rotor. Curved arrows show magnetic flux lines generated from magnetic poles of a two-pole disc magnet 11. The Z-axis is an axis passing the center O (thickness center) of the disc magnet 11 as an origin and perpendicular to the rotation plane of the magnet, corresponding to the rotation axis of the magnet rotor. The X-axis and the Y-axis are axes passing the center O as the origin and perpendicular to the Z-axis. In the positional relation shown in FIG. 14(a), the X-axis was the magnetization direction of the magnet, and the Y-axis was perpendicular to the magnetization direction. A magnetosensitive plane center of the sensor device 32a was at a position (z=0, φ=0°) on the X-axis away from the magnet surface by $r_1$, and the magnetosensitive plane was disposed perpendicular to the Z-axis (χ=0°). In this case, the sensor device 32a receives only a radial-direction magnetic flux density component $B_y$. $θ_m$ corresponds to the rotation angle of the magnet rotor. For instance, when the disc magnet 11 shown in FIG. 14(a) is rotated by a mechanical angle $θ_m$ of 90° in a circumferential direction, the sensor device 32a receives only a rotational-direction magnetic flux density component $B_θ$.

Figure 14C:
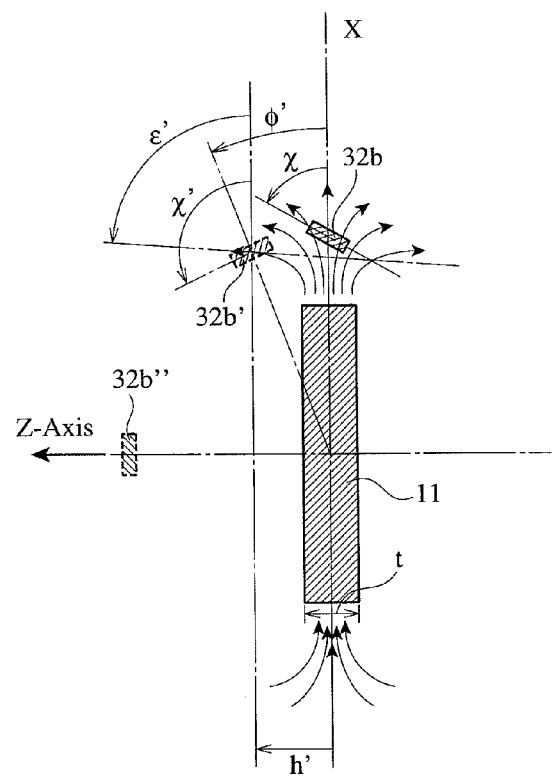
FIG. 14(c) is a schematic view showing various positional relations between the magnetic flux of a magnet with one pole pair and a sensor device.

The sensor device may be arranged at various positions, for instance, as shown in FIG. 14(c). FIG. 14(c) shows the positional relation of sensor devices 32b, 32b', 32b" in three types of rotation-angle-detecting apparatuses for explanation. The sensor device 32b had a magnetosensitive plane center on an X-Y plane (Z=0), and the magneto sensitive plane was inclined by x to the X-Y plane. The sensor device 32b' had a magnetosensitive plane center at a position (sensor arrangement angle of φ') separate from the X-Y plane by h' in the Z-axis direction, and the magnetosensitive plane was inclined by χ' to the X-Y plane. At the position of the sensor device 32b', the direction of a magnetic flux is inclined by ε' from the X-axis. In this case, too, the rotation axis is vertical to the paper plane, and the radial direction is an upper direction in the paper plane. The sensor device 32b" had a magnetosensitive plane center on the rotation axis of a disc magnet in the magnet rotor (φ"=90°), and the magnetosensitive plane was parallel to the X-Y plane (χ"=180°). At this position, the direction of a magnetic flux ε" is 180°. Even if the disc magnet 11 were replaced by a cylindrical magnet having larger thickness t in the Z-axis direction, a ring-shaped magnet having a center through-hole, or a rectangular magnet, the above definitions of angle, etc. would be valid as long as the magnet has one pole pair.

Figure 15A:
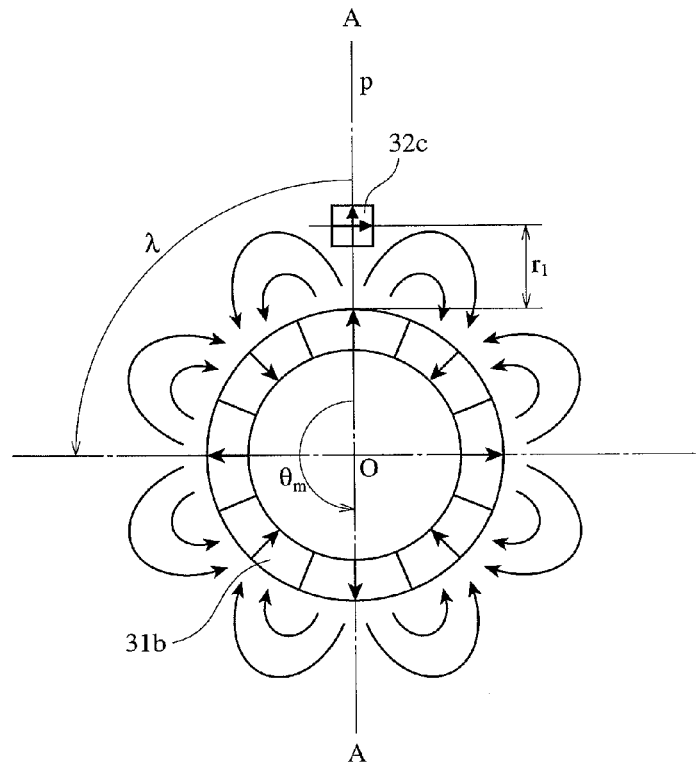
FIG. 15(a) is a schematic view showing the positional relation between the magnetic flux of a four-pole-pair magnet and a sensor device.
Figure 15B:
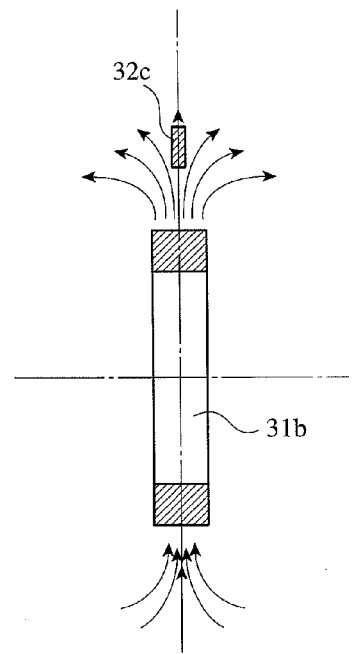
FIG. 15(b) is a cross-sectional view taken along the line A-A in FIG. 15(a).

FIGS. 15(a) and 15(b) show the positional relation of magnetic flux and a sensor device when a magnet with four pole pairs is used as a magnet rotor. Thick, straight arrows show the magnetization direction of each magnetic pole in a ring-shaped permanent magnet 31b in the magnet rotor, and thick, curved arrows show magnetic fluxes generated from the magnetic poles. λ corresponds to one wavelength (electric angle $θ_e$ of 360°) of a signal when a surface magnetic flux density distribution is measured, corresponding to a circumferential length extending over a pair of magnetic poles in the ring-shaped permanent magnet 31b. The Z-axis is an axis passing the hole center O of the ring-shaped permanent magnet 31b and perpendicular to the rotation plane of the magnet, corresponding to the rotation axis of the magnet rotor. The X axis and the Y axis are axes passing the center O as the origin and perpendicular to the Z axis. In the positional relation shown in FIG. 15(a), the X axis was the magnetization direction of the magnet, and the Y axis was perpendicular to the magnetization direction. The sensor device 32c had a magnetosensitive plane center at a position on the X axis separate from a surface of the ring-shaped permanent magnet 31b by $r_1$ (z=0, $\phi'$=0°), and the magnetosensitive plane was disposed perpendicular to the Z axis ($\chi$=0°). In this case, the sensor device 32c receives magnetic flux in the X-axis direction. When the ring-shaped permanent magnet 31b is rotated by an electric angle $\theta_e$ of 90° in a circumferential direction, the sensor device 32c is positioned between magnetic poles of the ring-shaped permanent magnet 31b, receiving magnetic flux in the Y-axis direction.

Figure 15C:
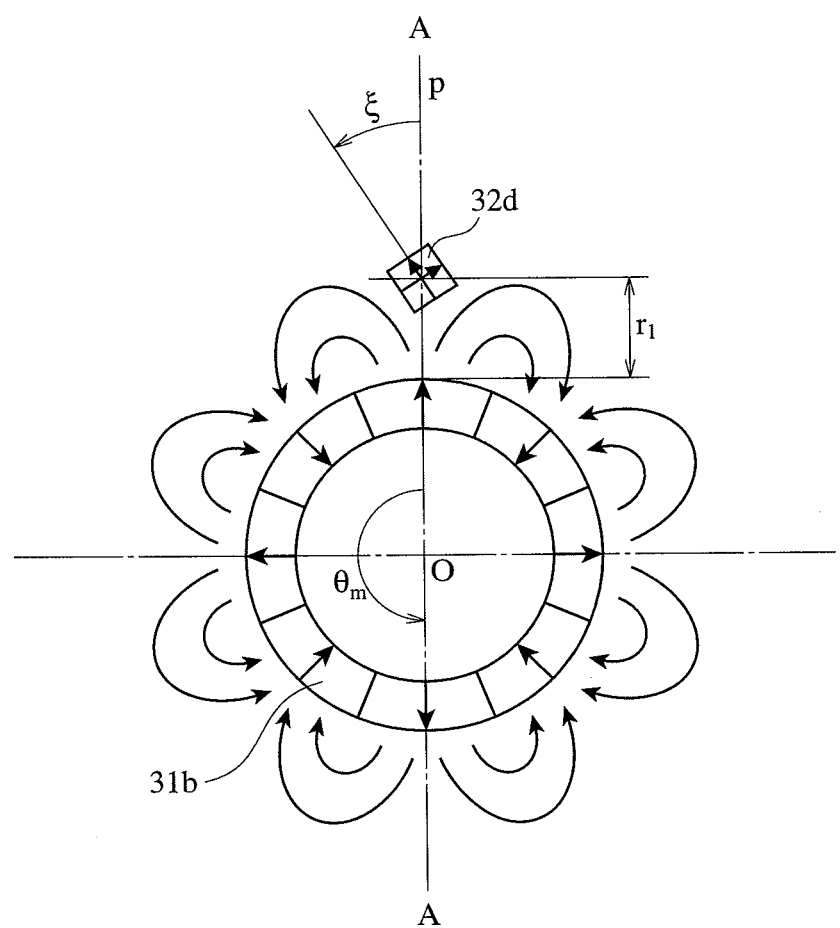
FIG. 15(c) is a schematic view showing the positional relation between the magnetic flux of a four-pole-pair magnet and a sensor device.

The sensor device 32d shown in FIG. 15(c) has a magnetic flux measurement direction inclined by $\xi$ from the radial (or rotational) direction of the magnet rotor. In this case, too, the correction coefficient k can be determined in the same manner as above as long as $\xi$ is within 10°. Even if the detection direction of a sensor bridge were slightly displaced from the radial (or rotational) direction of the magnet rotor, the correction coefficient k may be an amplitude ratio between the radial and rotational directions of the magnet rotor, or a value determined from $a_1$, $a_3$, $b_1$ and $b_3$ expressed by the formulae (1-1) and (1-2), which are obtained by Fourier expansion of their waveforms.

Figure 15D:
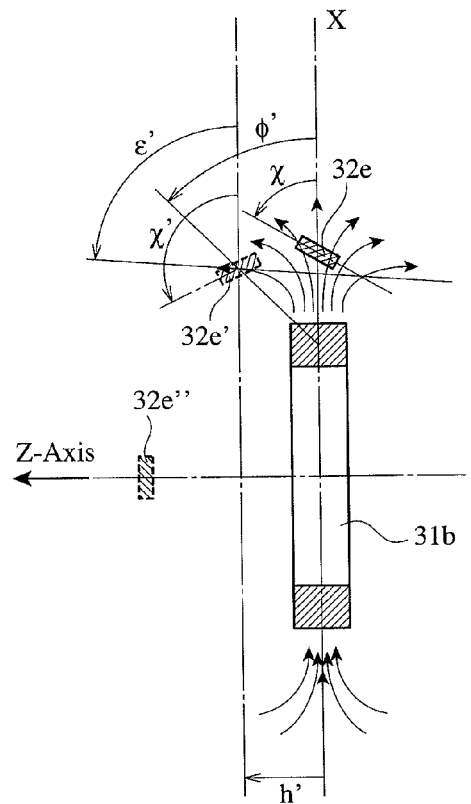
FIG. 15(d) is a schematic view showing various positional relations between the magnetic flux of a four-pole-pair magnet and a sensor device.

The sensor device may be disposed at various positions, for instance, as shown in FIG. 15(d). FIG. 15(d) shows the positional relation of sensor devices 32e, 32e', 32e" in three types of rotation-angle-detecting apparatuses for explanation. The definitions of a sensor inclination angle $\chi$, a sensor arrangement angle $\phi'$, a sensor inclination angle $\chi'$, h' and $\epsilon'$ are the same as in FIG. 14(c). A rotation shaft can be fitted into a hole of this ring magnet.

EXAMPLE 5

Figure 16:
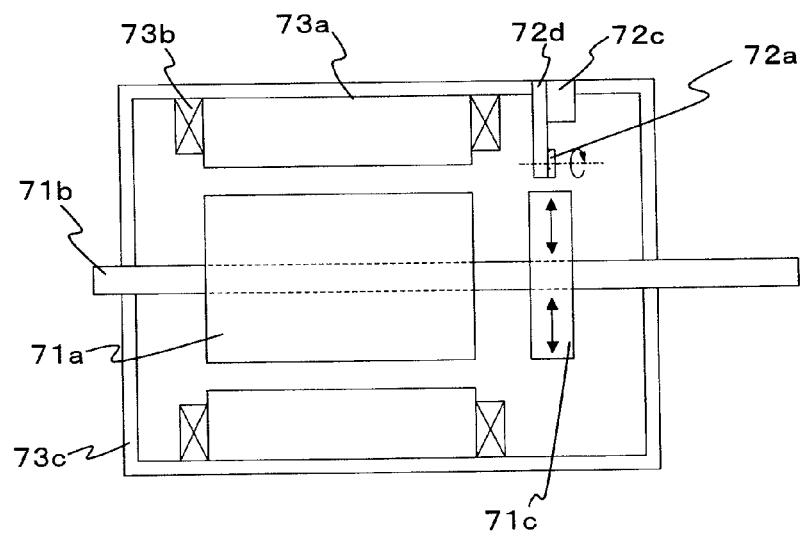
FIG. 16 is a schematic cross-sectional view showing one example of rotating machines comprising the rotation-angle-detecting apparatus of the present invention.

FIG. 16 schematically shows a rotating machine comprising the rotation-angle-detecting apparatus of Example 3. This rotating machine is a motor comprising a 12-pole, permanent magnet rotor 71a having a center shaft 71b in a frame 73c, and a stator 73a having a coil 73b, which is fixed to an inner surface of the frame 73c. The shaft 71b is rotatably supported by the frame 73c via a bearing (not shown). A magnet rotor 71c is fixed to the shaft 71b coaxially adjacent to the rotor 71a, and a sensor device 72a is fixed to the frame 73c via a support 72d such that it is positioned immediately beside the magnet rotor 71c. The direction of a magnetic flux applied from the magnet rotor 71c was detected by the sensor device 72a, whose output was treated by an operational circuit 72c, which output the rotation angle of the magnet rotor 71c.

COMPARATIVE EXAMPLE 1

Figure 17A:
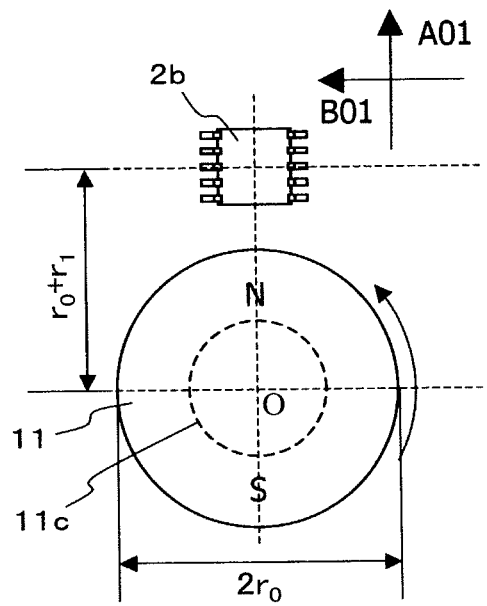
FIG. 17(a) is a schematic front view showing the rotation-angle-detecting apparatus of Comparative Example 1.
Figure 17B:
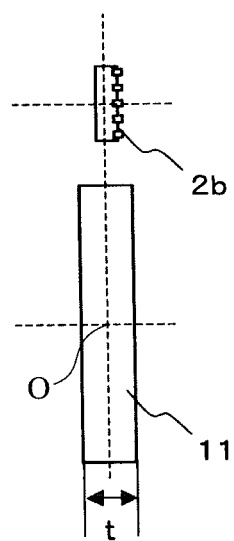
FIG. 17(b) is a schematic side view showing the rotation-angle-detecting apparatus of Comparative Example 1.
Figure 17C:
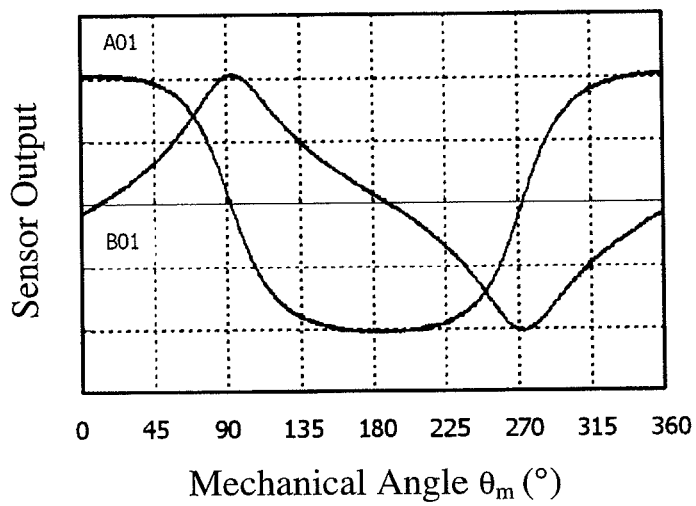
FIG. 17(c) is a graph showing the sensor output of the rotation-angle-detecting apparatus of Comparative Example 1.
Figure 17D:
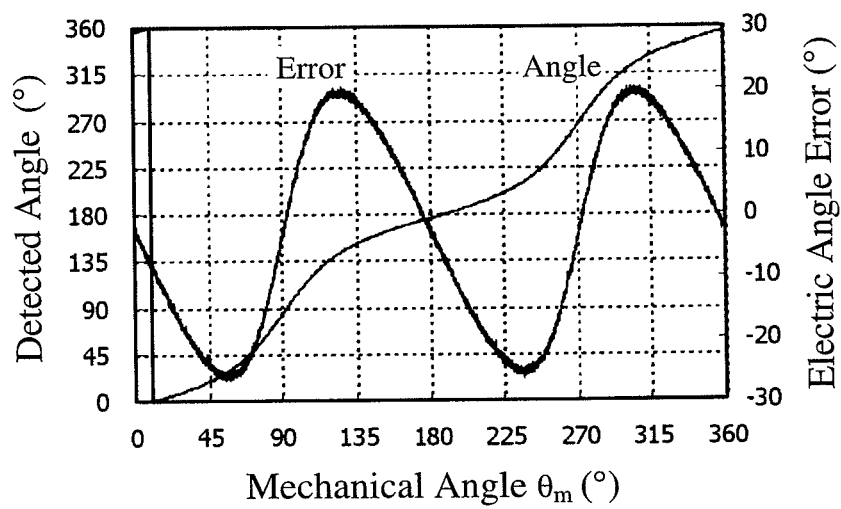
FIG. 17(d) is a graph showing the detection angle and error of the rotation-angle-detecting apparatus of Comparative Example 1.

A rotation-angle-detecting apparatus was produced by disposing a sensor device 2b around a disc magnet 11 comprising a magnet rotor with two magnetic poles as shown in FIGS. 17(a) and 17(b). Explanation will be made with cylindrical polar coordinates, whose origin is a center O of the disc magnet 11, and whose Z-axis is the rotation axis. The disc magnet 11 had a diameter $2r_o$ of 26 mm and an axial thickness t of 8 mm, and comprised a center shaft 11c. The sensor device 2b was the same as the above-described sensor device 2a, and disposed such that its magnetosensitive plane center was positioned on a plane (z=0) including the center O and perpendicular to the rotation axis. The distance $(r_o+r_1)$ from the Z axis to a center of the sensor device 2b was 23 mm. The magnetosensitive plane of the sensor device 2b was directed to the rotation axis ($\phi$=0° and $\chi$=0°). When the disc magnet 11 of the rotatable magnet rotor was rotated relative to the sensor device 2b, the sensor device 2b did not provide a sinusoidal output voltage as shown in FIG. 17(c); the output of a sensor bridge A01 (radial direction) had a substantially trapezoidal waveform, and the output of a sensor bridge B01 (rotational direction) had a substantially triangular waveform. The output voltage was not multiplied by a correction coefficient k in the operational circuit, failing to provide a linear arctangent calculation signal as shown in FIG. 17(d), and generating extremely large electric angle error of about ±20°.

REFERENCE EXAMPLE 1

Figure 18A:
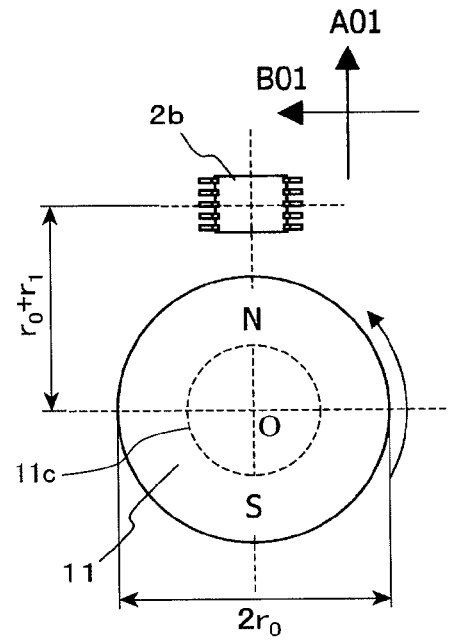
FIG. 18(a) is a schematic front view showing the rotation-angle-detecting apparatus of Reference Example 1.
Figure 18B:
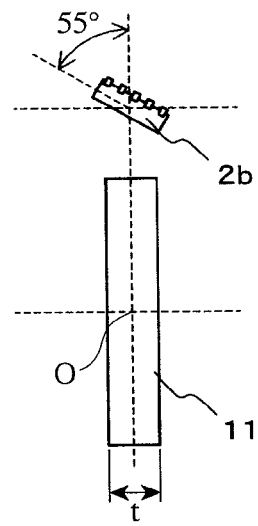
FIG. 18(b) is a schematic side view showing the rotation-angle-detecting apparatus of Reference Example 1.
Figure 18C:
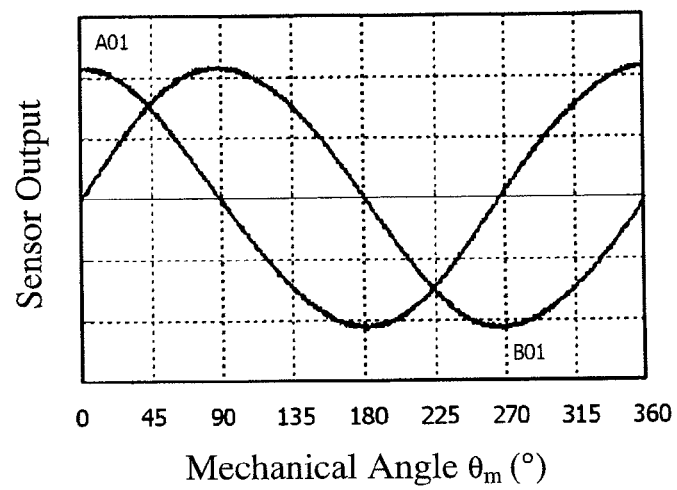
FIG. 18(c) is a graph showing the sensor output of the rotation-angle-detecting apparatus of Reference Example 1.
Figure 18D:
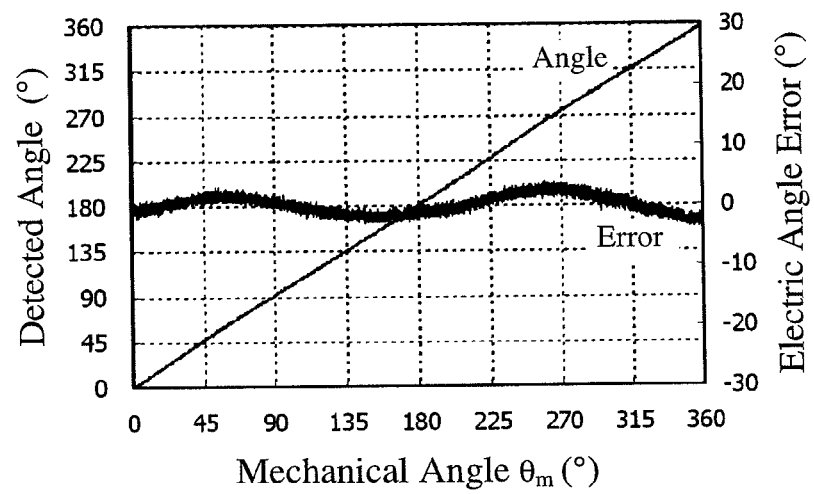
FIG. 18(d) is a graph showing the detection angle and error of the rotation-angle-detecting apparatus of Reference Example 1.

A rotation-angle-detecting apparatus was produced in the same manner as in Comparative Example 1 except for inclining the magnetosensitive plane of the sensor device 2b by 55° ($\chi$=55°) as shown in FIGS. 18(a) and 18(b). The measurement of the rotation angle characteristics of this rotation-angle-detecting apparatus as in Comparative Example 1 revealed that the outputs of sensor bridges had substantially cosine and sine waveforms, with angle errors of about ±4° as shown in FIGS. 18(c) and 18(d). By inclining the sensor device to reduce harmonics in the outputs, large improvement in angle detection accuracy was obtained over Comparative Example 1, indicating that angle errors can be reduced without using the correction coefficient k.

REFERENCE EXAMPLE 2

Figure 19A:
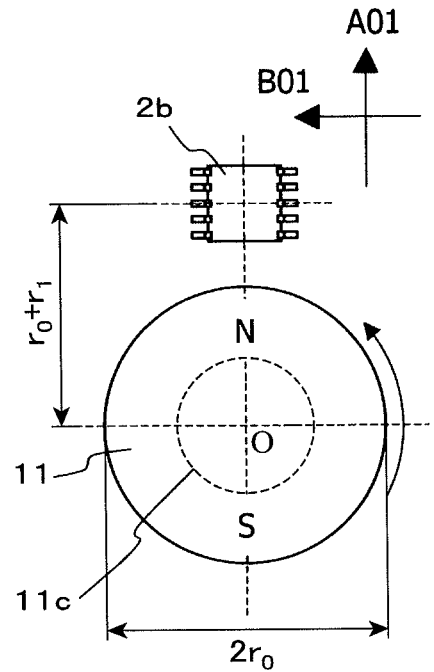
FIG. 19(a) is a schematic front view showing the rotation-angle-detecting apparatus of Reference Example 2.
Figure 19B:
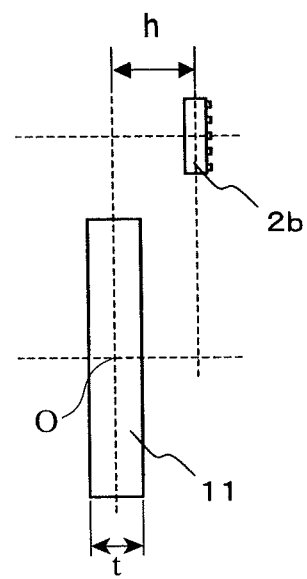
FIG. 19(b) is a schematic side view showing the rotation-angle-detecting apparatus of Reference Example 2.
Figure 19C:
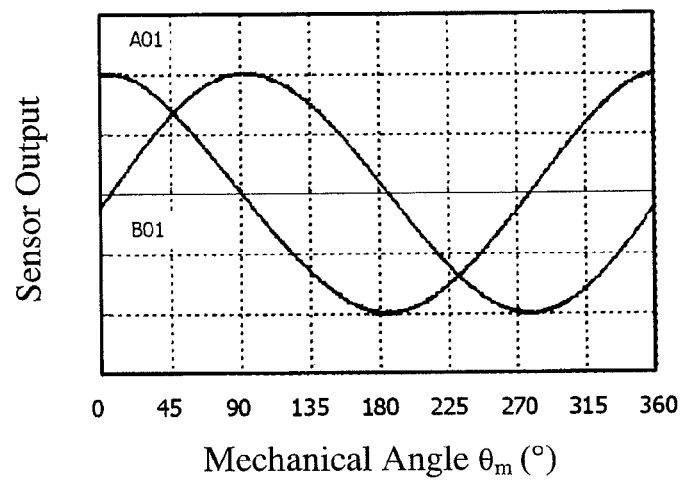
FIG. 19(c) is a graph showing the sensor output of the rotation-angle-detecting apparatus of Reference Example 2.
Figure 19D:
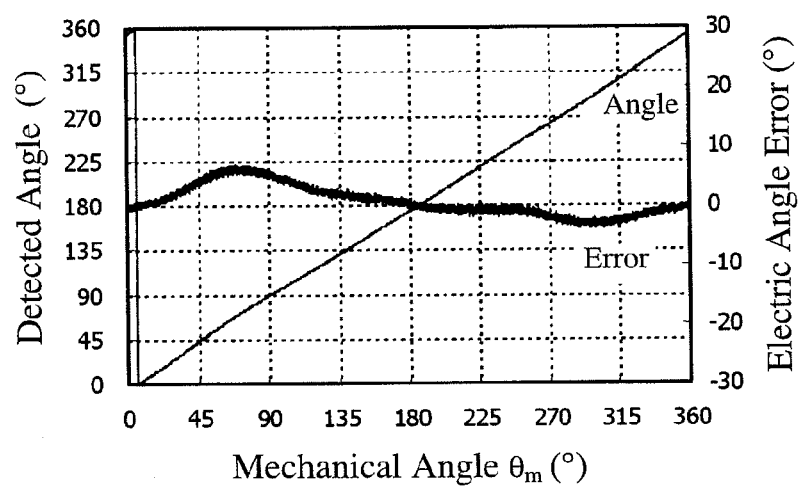
FIG. 19(d) is a graph showing the detection angle and error of the rotation-angle-detecting apparatus of Reference Example 2.

A rotation-angle-detecting apparatus was produced in the same manner as in Comparative Example 1 except for moving the sensor device 2b by h=15 mm in a rotation-axis direction as shown in FIGS. 19(a) and 19(b). The distance $(r_o+r_1)$ from the rotation axis (Z-axis) to a center of the sensor device 2b (center of a magnetosensitive plane) was 23 mm. The measurement of the rotation angle characteristics of this rotation-angle-detecting apparatus as in Comparative Example 1 revealed that angle errors were generated slightly, but extremely suppressed compared with Comparative Example 1, as shown in FIGS. 19(c) and 19(d). This rotation-angle-detecting apparatus had a sensor arrangement angle $\phi$ of about 33°, 2° or more deviating from the optimum sensor arrangement angle $\phi_{best}$, indicating that there were slight angle errors. A motor comprising this rotation-angle-detecting apparatus was able to detect the rotation angle with high accuracy. By moving the sensor device in a Z direction to reduce harmonics in the output, angle errors were reduced without using the correction coefficient k.

COMPARATIVE EXAMPLE 2

Figure 20A:
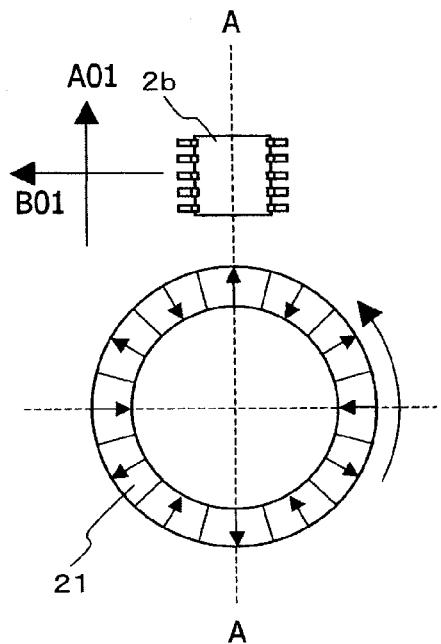
FIG. 20(a) is a schematic front view showing the rotation-angle-detecting apparatus of Comparative Example 2.
Figure 20B:
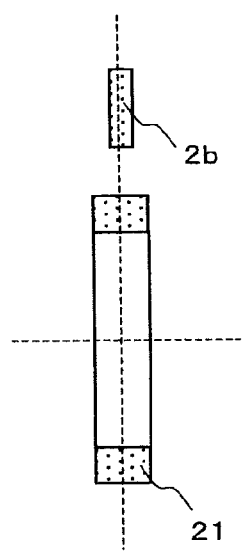
FIG. 20(b) is a cross-sectional view taken along the line A-A in FIG. 20(a).
Figure 20C:
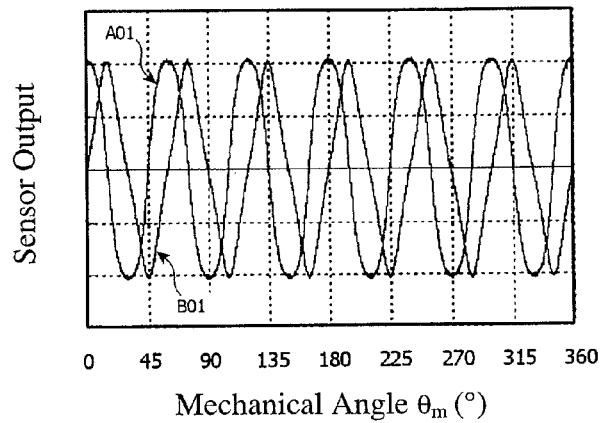
FIG. 20(c) is a graph showing the sensor output of the rotation-angle-detecting apparatus of Comparative Example 2.
Figure 20D:
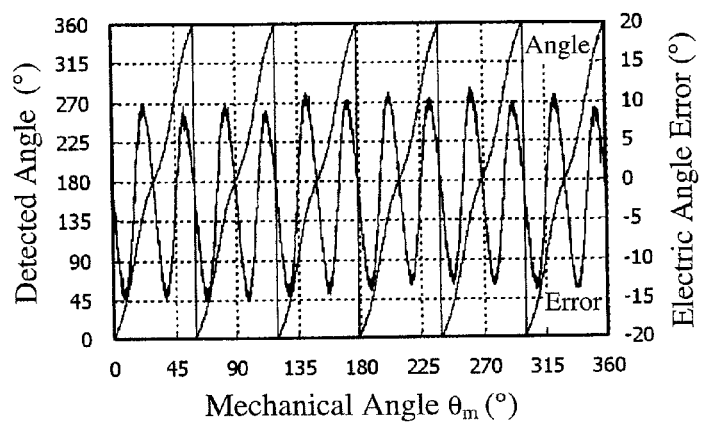
FIG. 20(d) is a graph showing the detection angle and error of the rotation-angle-detecting apparatus of Comparative Example 2.
Figure 20E:
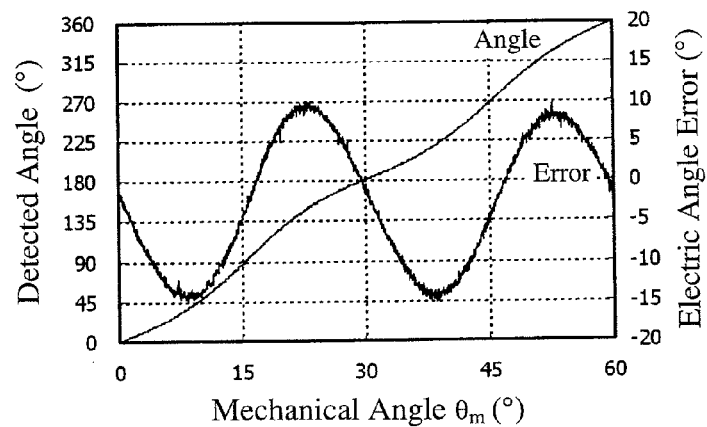
FIG. 20(e) is an enlarged graph showing the detection angle and error of the rotation-angle-detecting apparatus of Comparative Example 2.

A rotation-angle-detecting apparatus was produced by disposing a sensor device 2b around a multi-pole ring magnet 21 as shown in FIGS. 20(a) and 20(b). The ring magnet 21 having 12 magnetic poles on a peripheral surface had an inner diameter of 22.5 mm, an outer diameter of 25 mm and an axial thickness t of 4 mm. There was a ring-shaped, soft-magnetic yoke inside the ring magnet 21, and a shaft was fitted into a through-hole of the ring-shaped, soft-magnetic yoke, though not depicted. The distance from a peripheral surface of the ring magnet 21 to a center of the sensor device 2b was about 3 mm, and the sensor device 2b was disposed at an inclination angle $\chi$ of 0°. Because the ring magnet 21 had 12 magnetic poles, 6 periods of output was obtained by rotation of 360° (mechanical angle). Namely, a mechanical angle of 60° corresponds to one period of an electric angle. The output voltage was not multiplied by a correction coefficient k in an operational circuit. This rotation-angle-detecting apparatus ($\chi$=0°)

provided an output in a substantially trapezoidal waveform from the sensor bridge A01 (radial direction), and an output in a substantially triangular waveform from the sensor bridge B01 (rotational direction) [see FIG. 20(c)], though differing in the degree of deformation, like the rotation-angle-detecting apparatus of Comparative Example 1. As a result, angle error per one period of electric angle was as large as +10° or more as shown in FIGS. 20(d) and 20(e).

REFERENCE EXAMPLE 3

Figure 21A:
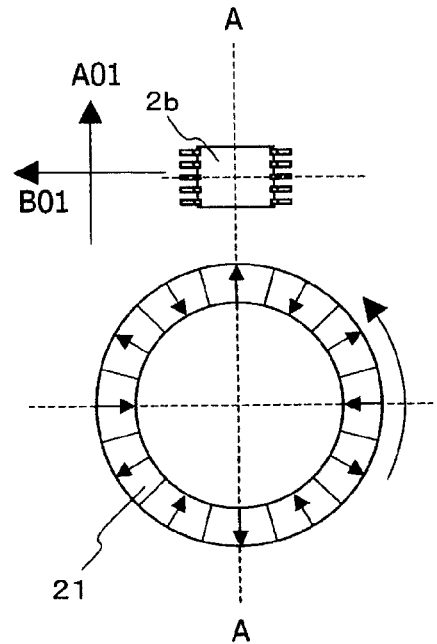
FIG. 21(a) is a schematic front view showing the rotation-angle-detecting apparatus of Reference Example 3.
Figure 21B:
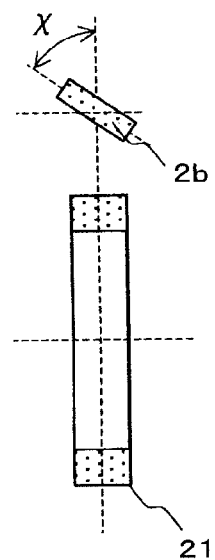
FIG. 21(b) is a cross-sectional view taken along the line A-A in FIG. 21(a).
Figure 21C:
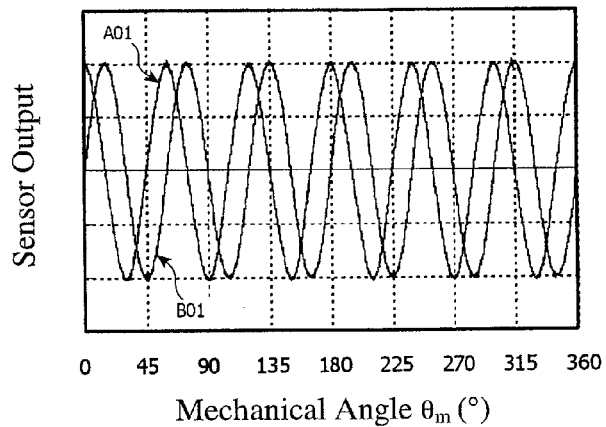
FIG. 21(c) is a graph showing the sensor output of the rotation-angle-detecting apparatus of Reference Example 3.
Figure 21D:
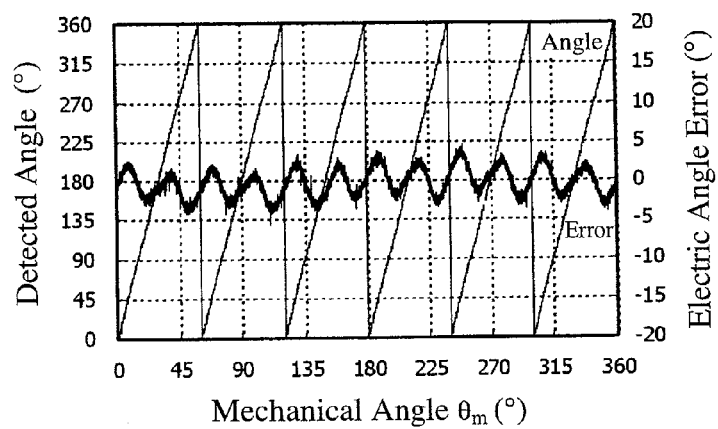
FIG. 21(d) is a graph showing the detection angle and error of the rotation-angle-detecting apparatus of Reference Example 3.
Figure 21E:
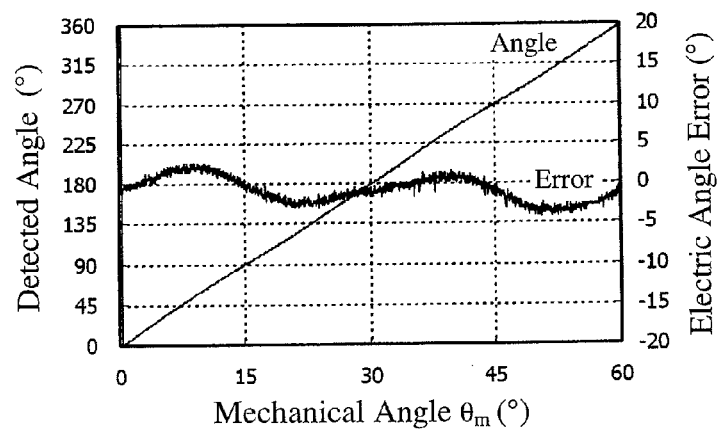
FIG. 21(e) is an enlarged graph showing the detection angle and error of the rotation-angle-detecting apparatus of Reference Example 3.

A rotation-angle-detecting apparatus was produced in the same manner as in Comparative Example 2, except for disposing the sensor device $2b$ at an inclination angle $\chi$ of 55° as shown in FIGS. 21(a) and 21(b). This rotation-angle-detecting apparatus provided outputs in substantially sine and cosine waveforms from the sensor bridges as shown in FIG. 21(c), resulting in electric angle error of about ±3° as shown in FIGS. 21(d) and 21(e), much improved than Comparative Example 2. A motor comprising this rotation-angle-detecting apparatus detected the rotation angle with high accuracy.

REFERENCE EXAMPLE 4

Figure 22A:
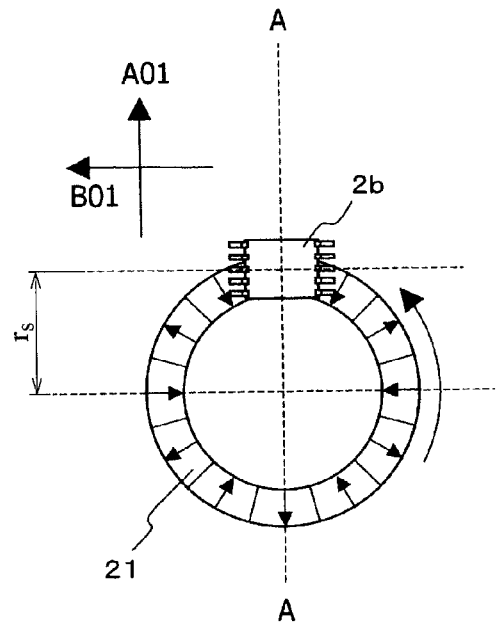
FIG. 22(a) is a schematic front view showing the rotation-angle-detecting apparatus of Reference Example 4.
Figure 22B:
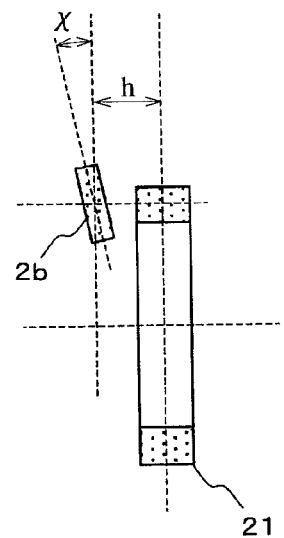
FIG. 22(b) is a cross-sectional view taken along the line A-A in FIG. 22(a).

A rotation-angle-detecting apparatus was produced in the same manner as in Comparative Example 2, except that the distance $r_s$ from the rotation axis to a center (center of a magnetosensitive plane) of the sensor device $2b$ was 24 mm, and that the sensor device $2b$ was disposed at a distance h of 4 mm in a rotation-axis direction with an inclination angle $\chi$ of 24.6° as shown in FIGS. 22(a) and 22(b). A motor comprising this rotation-angle-detecting apparatus detected the rotation angle with high accuracy.

EXAMPLE 6

Figure 23:
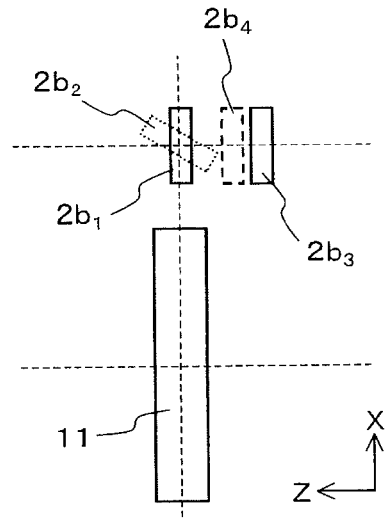
FIG. 23 is a schematic view showing the sensor devices of Comparative Example 1, Reference Examples 1 and 2 and Example 6 in a superimposed manner.

FIG. 23 shows the sensor devices $2b_1$, $2b_2$, $2b_3$ and $2b_4$ of Comparative Example 1, Reference Examples 1 and 2 and Example 6 to clarify their positional relations. The magnet rotor commonly comprises a 2-pole disc magnet 11. Though angle errors were reduced by changing the position of the sensor device from Comparative Example 1 (sensor device $2b_1$) to Reference Example 1 or 2 (sensor device $2b_2$ or $2b_3$) as described above, the inclination or Z-direction shift of the sensor device is likely disadvantageous in making the rotation-angle-detecting apparatus thinner in an axial direction. Thus, a rotation-angle-detecting apparatus (Example 6) comprising a sensor device $2b_4$ with a reduced Z-direction distance h and a magnetosensitive plane perpendicular to the axis of the magnet rotor was produced to conduct rotation angle detection using the above amplitude correction method 1. Though the displacement of the sensor device from the position in Reference Example 1 or 2 (sensor device $2b_2$ or $2b_3$) to the position in Example 6 (sensor device $2b_4$) provided larger angle errors, the multiplication of the output voltage by the correction coefficient k in an operational circuit made angle errors in Example 6 smaller than those in Reference Example 1 or 2. Incidentally, Example 6 reduced harmonics in the output to lower angle errors as in Reference Example 1 or 2.

EXAMPLES 7 AND 8

Figure 24:
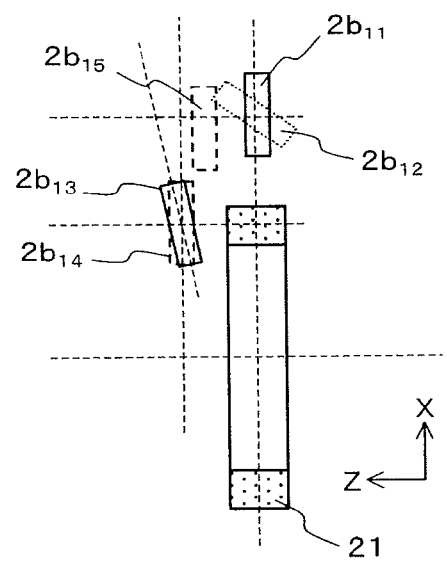
FIG. 24 is a schematic view showing the sensor devices of Comparative Example 2, Reference Example 3 and 4 and Examples 7 and 8 in a superimposed manner.

FIG. 24 shows the sensor devices $2b_{11}$, $2b_{12}$, $2b_{13}$, $2b_{14}$ and $2b_{15}$ of Comparative Example 2, Reference Examples 3 and 4, and Examples 7 and 8 to clarify their positional relations. The magnet rotor commonly comprises a 12-pole ring magnet 21. Though the displacement of the sensor device from Comparative Example 2 (sensor device $2b_{11}$) to Reference Example 3 or 4 (sensor device $2b_{12}$ or $2b_{13}$) reduced angle errors as described above, it is likely disadvantageous in making the rotation-angle-detecting apparatus thinner in an axial direction, because the arrangement of such a sensor device needs a mounter with an axially projecting inclined surface as in Reference Example 3 or 4. Thus, a rotation-angle-detecting apparatus of Example 7 or 8 comprising a sensor device having a magnetosensitive plane perpendicular to the axis of the magnet rotor (sensor device $2b_{14}$ or $2b_{15}$ depicted by a dotted line) was produced to conduct rotation angle detection using the above amplitude correction method 1. Though the displacement of the sensor device from the position in Reference Example 3 or 4 (sensor device $2b_{12}$ or $2b_{13}$) to the position in Example 7 or 8 (sensor device $2b_{14}$ or $2b_{15}$) provided larger angle errors, the multiplication of the output voltage by the correction coefficient k in an operational circuit made angle errors in Example 7 or 8 smaller than those in Reference Example 3 or 4.

Figure 25:
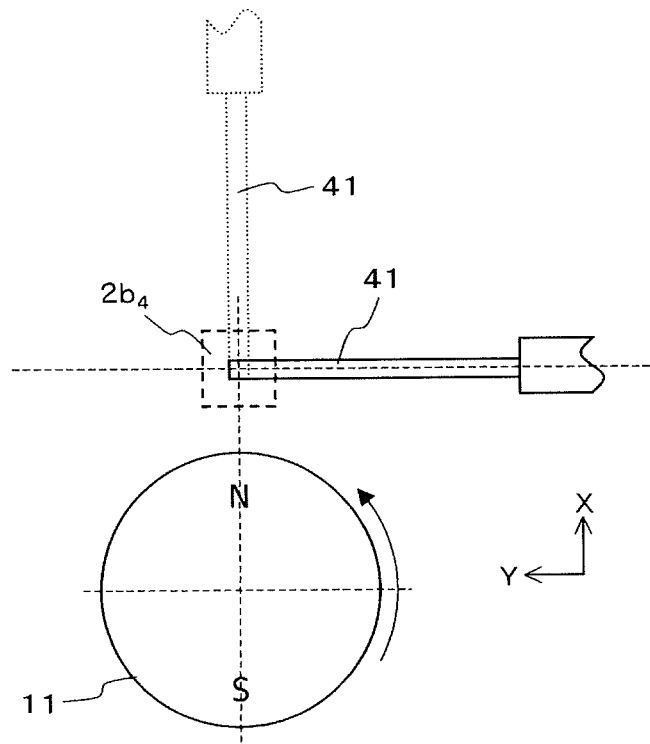
FIG. 25 is a schematic view showing a method of measuring a magnetic flux density amplitude of the magnet rotor in radial and rotational directions.

Taking the rotation-angle-detecting apparatus of Example 6 for example, a method of measuring $B\perp$ and $B_{//}$ generated from the magnet rotor at a sensor device position to determine a magnetic flux density amplitude ratio K' ($=B\perp/B_{//}$) will be explained. FIG. 25 schematically shows the measurement of $B\perp$ and $B_{//}$ generated from the magnet rotor at the position of the sensor device in Example 6. Though a disc magnet 11 was used as the magnet rotor in this example, the same measurement method can be conducted even when a ring magnet 21 is used. First, the position of the sensor device $2b_4$ relative to the disc magnet 11 was set to determine the coordinates of its magnetosensitive plane center (point at which dotted lines cross perpendicularly in FIG. 25). The sensor device $2b_4$ was then replaced by a Hall sensor probe to measure $B\perp$ and $B_{//}$. Specifically, the magnetosensitive center of the Hall sensor probe 41 was placed on the magnetosensitive plane center as shown by the solid line, and the disc magnet 11 was rotated to measure $B\perp$, with the magnetosensitive axis of the Hall sensor probe 41 aligned with the radial direction of the disc magnet 11. With the probe inclined by 90°, the magnetosensitive center of the Hall sensor probe 41 placed on the magnetosensitive plane center as shown by the dotted line, and the magnetosensitive axis of the Hall sensor probe 41 aligned with the rotational direction of the disc magnet 11, the disc magnet was rotated to measure $B_{//}$. K'($=B\perp/B_{//}$) was determined from the measured $B\perp$ and $B_{//}$, and used as a correction coefficient k. In any measurements, the longitudinal direction of the Hall sensor probe 41 was perpendicular to the axial direction of the magnet rotor. Though a gauss meter having a magnetosensitive axis perpendicular to the longitudinal direction of the Hall sensor probe was used in FIG. 25, a gauss meter having a magnetosensitive axis in parallel to the longitudinal direction of the Hall sensor probe may also be used.

EFFECT OF THE INVENTION

Angle errors can be reduced by the rotation-angle-detecting apparatus of the present invention. Because the rotation-angle-detecting method of the present invention can reduce angle errors irrespective of where a sensor device is positioned, the sensor device can be placed at a position providing the maximum magnetic flux density, making it possible to reduce a magnet volume. As a result, a volume occupied by the rotation-angle-detecting apparatus can be made smaller.

What is claimed is:

1. An apparatus for detecting a rotation angle using a magnet rotor comprising a magnet having 2N poles, wherein N is a natural number, and a sensor device for detecting the direction of a magnetic flux from said magnet rotor, wherein at least one of two output voltages obtained in radial and rotational directions by said sensor device is multiplied or divided by a correction coefficient to make an amplitude ratio of the output voltages within a predetermined range of an amplitude ratio of magnetic flux densities in radial and rotational directions at the position of the sensor device, to obtain corrected output voltages, and wherein the rotation angle is calculated from the corrected output voltages to increase the detection accuracy of the rotation angle.

2. The apparatus according to claim 1, wherein a ratio K of the peak value of the corrected output voltage in a radial direction to the peak value of the corrected output voltage in a rotational direction is within a range of K=K'±0.3N, wherein K' is a ratio $B\perp/B_{//}$ of the amplitude $B\perp$ of a magnetic flux density in a radial direction to the amplitude $B//$ of a magnetic flux density in a rotational direction at the position of said sensor device.

3. The apparatus according to claim 1, wherein at least one of two output waveforms of the two output voltages obtained in the radial and rotational directions by said sensor device is multiplied or divided by the correction coefficient to obtain corrected output waveforms, and wherein the rotation angle is calculated from the corrected output waveforms to increase the detection accuracy of the rotation angle.

4. The apparatus according to claim 3, wherein a ratio K of the peak value of the corrected output waveform in a radial direction to the peak value of the corrected output waveform in a rotational direction is within a range of K=K'±0.3N, wherein K' is a ratio $B\perp/B_{//}$ of the amplitude $B\perp$ of a magnetic flux density in a radial direction to the amplitude $B_{//}$ of a magnetic flux density in a rotational direction at the position of said sensor device.

5. The apparatus according to claim 3, wherein said sensor device has a magnetosensitive plane constituted by pluralities of spin-valve, giant-magnetoresistive devices having pinned layers whose magnetization directions are fixed to two perpendicular directions and free layers whose magnetization directions rotate depending on the direction of a magnetic flux, and wherein said correction coefficient is a value depending on a ratio of the maximum amplitude of a magnetic flux density waveform in a radial direction to the maximum amplitude of a magnetic flux density waveform in a rotational direction at the position of said sensor device.

6. A rotation-angle-detecting apparatus comprising a magnet rotor comprising a magnet having 2N poles, wherein N is a natural number, and a sensor device for detecting the direction of a magnetic flux from said magnet rotor, said sensor device having a magnetosensitive plane constituted by pluralities of spin-valve, giant-magnetoresistive devices each having a pinned layer whose magnetization direction is fixed and a free layer whose magnetization direction rotates depending on the direction of a magnetic flux, thereby having sensor bridges A01 and B01 each having pinned layers whose magnetization directions are perpendicular to each other, each of said sensor bridges A01 and B01 being a bridge circuit comprising said spin-valve, giant-magnetoresistive devices, the spin-valve, giant-magnetoresistive devices on the electrically adjacent sides in each of said bridge circuits having pinned layers having antiparallel magnetization directions, with voltage applied, each of said sensor bridges A01 and B01 providing output voltages depending on an angle between the magnetization direction of said pinned layer and the magnetization direction of said free layer, and at least one of said output voltages being multiplied or divided by a correction coefficient, to make an amplitude ratio of the output voltages within a predetermined range of an amplitude ratio of magnetic flux densities in radial and rotational directions at the position of the sensor device, to obtain corrected output voltages, from which an angle signal is obtained.

7. The rotation-angle-detecting apparatus according to claim 6, wherein a ratio K of the peak value of the corrected output voltage in a radial direction to the peak value of the corrected output voltage in a rotational direction is within a range of K=K'±0.3N, wherein K' is a ratio $B\perp/B_{//}$ of the amplitude $B\perp$ of a magnetic flux density in a radial direction to the amplitude $B_{//}$ of a magnetic flux density in a rotational direction at the position of said sensor device.

8. A rotation-angle-detecting apparatus comprising a magnet rotor comprising a magnet having 2N poles, wherein N is a natural number, and a sensor device for detecting the direction of a magnetic flux from said magnet rotor, said sensor device having a magnetosensitive plane constituted by pluralities of spin-valve, giant-magnetoresistive devices each having a pinned layer whose magnetization direction is fixed and a free layer whose magnetization direction rotates depending on the direction of a magnetic flux, thereby having sensor bridges A01 and B01 each having pinned layers whose magnetization directions are perpendicular to each other, each of said sensor bridges A01 and B01 being a bridge circuit comprising said spin-valve, giant-magnetoresistive devices, the spin-valve, giant-magnetoresistive devices on the electrically adjacent sides in each of said bridge circuits having pinned layers having antiparallel magnetization directions, with voltage applied, each of said sensor bridges A01 and B01 providing output voltages ($V_x$, $V_y$) depending on an angle between the magnetization direction of said pinned layer and the magnetization direction of said free layer, wherein $V_x$ is the output voltage of said sensor bridge A01 whose pinned layers have a magnetization direction in the radial direction of said magnet rotor, and $V_y$ is the output voltage of said sensor bridge B01 whose pinned layers have a magnetization direction in the rotational direction of said magnet rotor, and at least one of said output voltages being multiplied or divided by a correction coefficient to obtain an angle signal, wherein said correction coefficient is calculated from $a_1$, $a_3$, $b_1$ and $b_3$ in the following Fourier series (1-1) and (1-2) expanded from $V_x$ and $V_y$ in one period of electric angle;

$$V_x = a_1 \cos \theta_{mag} + a_3 \cos 3\theta_{mag} + a_5 \cos 5\theta_{mag} + \ldots \qquad (1\text{-}1), \text{ and}$$

$$V_y = b_1 \sin \theta_{mag} + b_3 \sin 3\theta_{mag} + b_5 \sin 5\theta_{mag} + \ldots \qquad (1\text{-}2).$$

9. The rotation-angle-detecting apparatus according to claim 8, which uses a correction coefficient k=k'±0.3N, wherein N is the number of pole pairs in the magnet rotor, and k' is represented by the formula (2) of $k'=(a_1-a_3)/(b_1+b_3)$, wherein $a_1$, $a_3$, $b_1$ and $b_3$ are given by the formulae (1-1) and (1-2).

10. The rotation-angle-detecting apparatus according to claim 8, wherein said sensor device is disposed at a position where the maximum magnetic flux density in a radial direction is different from the maximum magnetic flux density in a rotational direction.

11. The rotation-angle-detecting apparatus according to claim 8, wherein the magnetosensitive plane of said sensor device is positioned on a plane perpendicular to the rotation axis that passes through the center of said magnet rotor in an axial direction.

12. A method for detecting the rotation angle of a magnet rotor comprising a magnet having 2N poles, wherein N is a natural number, the method comprising
measuring the periodic changes of a magnetic flux generated from said magnet rotor in radial and rotational directions by a sensor device to obtain output voltages ($V_x$, $V_y$),
multiplying or dividing at least one of said output voltages by a correction coefficient, to make an amplitude ratio of the output voltages within a predetermined range of an amplitude ratio of magnetic flux densities in radial and rotational directions at the position of the sensor device, to obtain corrected output voltages; and
determining the rotation angle $\theta_{meas}$ of said magnet rotor from the corrected output voltages.

13. The method according to claim 12, wherein a ratio K of the peak value of the corrected output voltage in a radial direction to the peak value of the corrected output voltage in a rotational direction is within a range of K=K'±0.3N, wherein K' is a ratio $B\perp/B_{//}$ of the amplitude $B\perp$ of a magnetic flux density in a radial direction to the amplitude $B_{//}$ of a magnetic flux density in a rotational direction at the position of said sensor device.

14. The method according to claim 12, wherein using k as said correction coefficient, the rotation angle $\theta_{meas}$ of said magnet rotor is determined by the formula (3) or (4);

$$\theta_{meas} = \tan^{-1}[V_x/(V_y \cdot k)] \tag{3}$$

when the AC power in a rotational direction is smaller, and $$\theta_{meas} = \tan^{-1}[(V_x \cdot k)/V_y] \tag{4}$$

when the AC power in a radial direction is smaller.

15. The method according to claim 14, wherein said correction coefficient k is determined from K', which is an amplitude ratio $B\perp/B_{//}$ of the amplitude $B\perp$ of a magnetic flux density in a radial direction to the amplitude $B_{//}$ of a magnetic flux density in a rotational direction at the position of the sensor device.

16. The method according to claim 14, wherein said correction coefficient k is calculated from a1, a3, b1 and b3 in the Fourier series (5-1) and (5-2) expanded from said output voltages ($V_x$, $V_y$) in one period of the electric angle;

$$V_x = a_1 \cos\theta_{mag} + a_3 \cos 3\theta_{mag} + a_5 \cos 5\theta_{mag} + \ldots \tag{5-1}$$

and $$V_y = b_1 \sin\theta_{mag} + b_3 \sin 3\theta_{mag} + b_5 \sin 5\theta_{mag} + \ldots \tag{5-2}$$

17. The method according to claim 16, wherein said correction coefficient k is calculated from k', which is determined from $a_1$, $a_3$, $b_1$ and $b_3$ by the following formula (6);

$$k' = (a_1 - a_3)/(b_1 + b_3) \tag{6}$$

18. The method according to claim 17, wherein said correction coefficient k is a value within a range of k=k'±0.3N, wherein N is the number of pole pairs of the magnet rotor, and k' is determined by said formula (6).

* * * * *